United States Patent
Seo et al.

(10) Patent No.: US 9,730,174 B2
(45) Date of Patent: Aug. 8, 2017

(54) METHOD OF TRANSMITTING A SCHEDULING ASSIGNMENT SIGNAL FOR DEVICE-TO-DEVICE COMMUNICATION IN A WIRELESS COMMUNICATION SYSTEM, AND AN APPARATUS THEREOF

(71) Applicant: LG ELECTRONICS INC., Seoul (KR)

(72) Inventors: Daewon Seo, Seoul (KR); Hanbyul Seo, Seoul (KR); Myoungseob Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 203 days.

(21) Appl. No.: 14/634,320

(22) Filed: Feb. 27, 2015

(65) Prior Publication Data
US 2015/0245383 A1 Aug. 27, 2015

Related U.S. Application Data

(60) Provisional application No. 61/945,758, filed on Feb. 27, 2014, provisional application No. 61/948,535, (Continued)

(51) Int. Cl.
*H04W 4/00* (2009.01)
*H04W 56/00* (2009.01)
(Continued)

(52) U.S. Cl.
CPC ......... *H04W 56/002* (2013.01); *H04L 5/0032* (2013.01); *H04L 5/0048* (2013.01); *H04L 5/0094* (2013.01); *H04L 27/2613* (2013.01); *H04L 27/2692* (2013.01); *H04W 72/1289* (2013.01); *H04W 76/023* (2013.01); *H04L 5/0023* (2013.01)

(58) Field of Classification Search
CPC .............. H04L 5/0053; H04L 27/2613; H04L 27/2692; H04L 67/104; H04L 67/1051; H04L 5/0032; H04L 5/0048; H04L 5/0094; H04W 4/08; H04W 56/002; H04W 72/02; H04W 72/12; H04W 72/1289
USPC ................. 370/310, 328–330, 350; 375/267; 709/208, 248
See application file for complete search history.

(56) References Cited

U.S. PATENT DOCUMENTS

2010/0034312 A1* 2/2010 Muharemovic ..... H04L 27/2613
375/267
2013/0132501 A1* 5/2013 Vandwalle ............ H04L 67/104
709/208

(Continued)

*Primary Examiner* — Kwang B Yao
*Assistant Examiner* — Harun Chowdhury
(74) *Attorney, Agent, or Firm* — Birch, Stewart, Kolasch & Birch, LLP

(57) ABSTRACT

Disclosed are a method for transmitting a signal for device-to-device (D2D) communication of a user equipment in a wireless communication system and an apparatus for the same. Specifically, the method includes transmitting a D2D signal assigned at least one of a first synchronization information, a second synchronization information and a scheduling assignment information in a scheduling assignment resource unit. The first synchronization information and the second synchronization information are configured to be transmitted with different periodicities.

6 Claims, 25 Drawing Sheets

Related U.S. Application Data filed on Mar. 5, 2014, provisional application No. 61/952,855, filed on Mar. 13, 2014, provisional application No. 61/980,009, filed on Apr. 15, 2014.

(51) Int. Cl.
*H04W 76/02* (2009.01)
*H04W 72/12* (2009.01)
*H04L 27/26* (2006.01)
*H04L 5/00* (2006.01)

(56) References Cited

U.S. PATENT DOCUMENTS

2014/0198747 A1* 7/2014 Ouchi .................. H04L 5/0053
370/329
2016/0183276 A1* 6/2016 Marinier ............... H04W 72/02
370/329

* cited by examiner

E-UMTS

FIG. 2
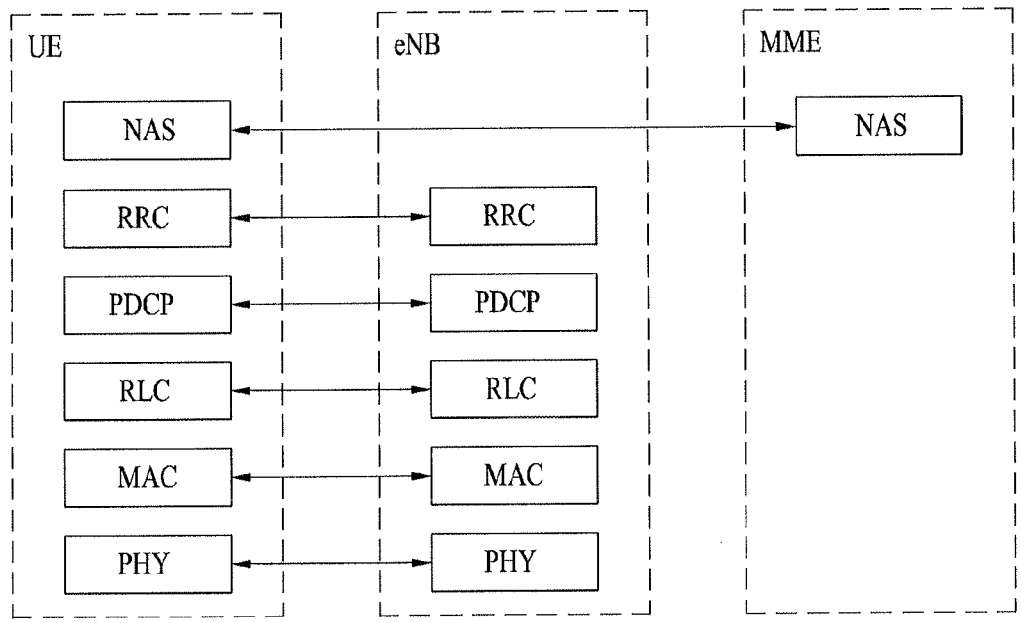
(a) Control-Plane Protocol Stack
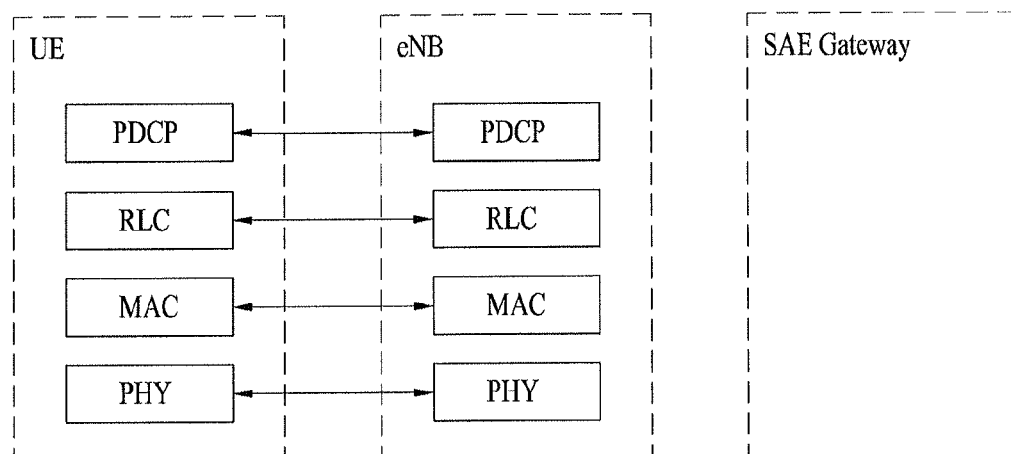
(b) User-Plane Protocol Stack (a)  (b)

(a)  (b)

FIG. 25
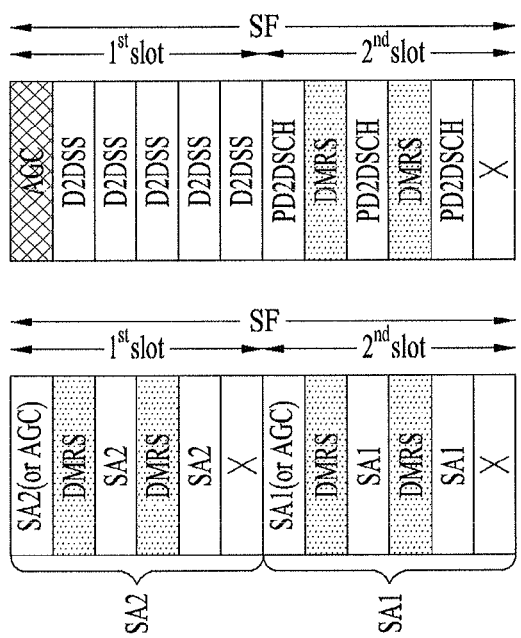
(a)
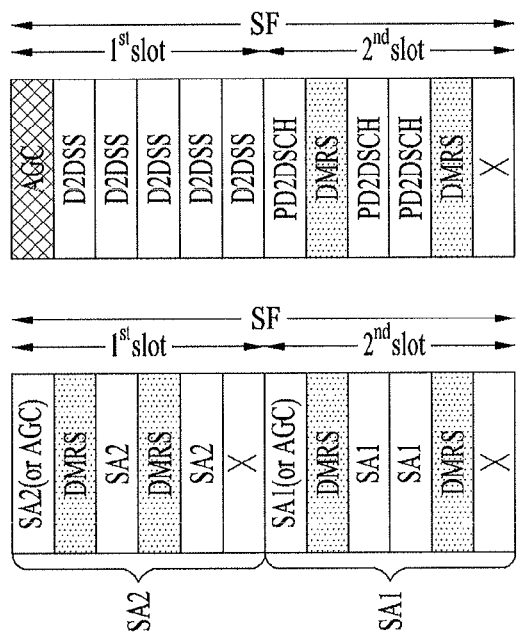
(b)

METHOD OF TRANSMITTING A SCHEDULING ASSIGNMENT SIGNAL FOR DEVICE-TO-DEVICE COMMUNICATION IN A WIRELESS COMMUNICATION SYSTEM, AND AN APPARATUS THEREOF

This application claims the benefit of U.S. Provisional Patent Application No. 61/945,758 filed on Feb. 27, 2014, and U.S. Provisional Patent Application No. 61/948,535 filed on Mar. 5, 2014, and U.S. Provisional Patent Application No. 61/952,855 filed on Mar. 13, 2014, and U.S. Provisional Patent Application No. 61/980,009 filed on Apr. 15, 2014, which are hereby incorporated by reference as if fully set forth herein.

BACKGROUND OF THE INVENTION

Field of the Invention

The present invention relates to a wireless communication system, and more particularly, to a method and apparatus for transmitting a scheduling assignment signal for Device-to-Device (D2D) communication in a wireless communication system.

Discussion of the Related Art

As an example of a wireless communication system to which the present invention is applicable, a 3rd Generation Partnership Project Long Term Evolution (3GPP LTE; hereinafter, "LTE") communication system is broadly described below.

FIG. 1 is a diagram schematically illustrating an E-UMTS network structure as an example of a wireless communication system. The Evolved Universal Mobile Telecommunications System (E-UMTS) is a system evolved from the conventional UMTS. A basic standardization process for the E-UMTS is being carried out in the current 3GPP. Generally, the E-UMTS may be referred to as a Long Term Evolution (LTE) system. For details of the technical specifications of the UMTS and the E-UMTS, reference may be made to Release 7 and Release 8 of "3rd Generation Partnership Project; Technical Specification Group Radio Access Network".

Referring to FIG. 1, the E-UMTS includes a User Equipment (UE), base stations (eNode B, eNB), and an Access Gateway (AG), which is located at an end of a network (E-UTRAN) and connected to an external network. The base stations may simultaneously transmit multiple data streams for a broadcast service, a multicast service and/or a unicast service.

One or more cells may exist for one eNB. One cell is set to one of bandwidths of 1.44, 3, 5, 10, 15, and 20 Mhz to provide a downlink or uplink transport service to several UEs. Different cells may be configured to provide different bandwidths. An eNB controls transmission/reception data to/from multiple UEs. For downlink (DL) data, the eNB transmits DL scheduling information to a UE to notify information related to time/frequency regions in which data will be transmitted, encoding, data size, and hybrid automatic repeat, and request (HARQ)-related information to the UE. For uplink (UL) data, the eNB transmits UL scheduling information to the corresponding UE to notify the UE of the time/frequency regions that can be used by the UE, encoding, data size, and HARQ-related information. An interface for transmitting user traffic or control traffic may be used between eNBs. A core network (CN) may include an access gateway (AG) and a network node for user registration of the UE. The AG manages mobility of a UE on the tracking area (TA)-by-TA basis, wherein one TA includes a plurality of cells.

The wireless communication technology has been developed up to the LTE based upon WCDMA. However, the demands and expectations from the users and the communication operators are consistently growing. In addition, since other wireless access technologies are constantly being developed, the wireless communication technology is required to evolve in order to secure competitiveness in the future. Accordingly, cost reduction per bit, enhanced service availability, use of a flexible frequency band, a simple structure and open interface, and proper power consumption of the UE are requested.

SUMMARY OF THE INVENTION

An object of the present invention is to provide a method and apparatus for transmitting a scheduling assignment signal for Device-to-Device (D2D) communication in a wireless communication system.

Additional advantages, objects, and features of the invention will be set forth in part in the description which follows and in part will become apparent to those having ordinary skill in the art upon examination of the following or may be learned from practice of the invention.

An object of the present invention is to provide a method for transmitting a signal for device-to-device (D2D) communication of a user equipment in a wireless communication system, the method including transmitting a D2D signal assigned at least one of a first synchronization information, a second synchronization information and a scheduling assignment information in a scheduling assignment resource unit, wherein the first synchronization information and the second synchronization information are configured to be transmitted with different periodicities.

The method may further include transmitting at least one demodulation reference signal (DMRS) defined for channel estimation for the scheduling assignment information. The at least one DMRS may be configured to be distinguished by a cyclic shift value. Alternatively, the at least one DMRS may be configured to be distinguished using different offsets. A sequence of the at least one DMRS may be generated based on an identity of the user equipment.

A subframe number assigned the scheduling assignment information may be indicated through higher layer signaling.

Another object of the present invention is to provide a user equipment (UE) for device-to-device (D2D) communication in a wireless communication system including a radio frequency unit, and a processor, wherein the processor is configured to transmit a D2D signal assigned at least one of a first synchronization information, a second synchronization information and a scheduling assignment information in a scheduling assignment resource unit, wherein the first synchronization information and the second synchronization information may be configured to be transmitted with different periodicities.

According to the present invention, the signal for D2D communication may be efficiently transmitted in the wireless communication system.

The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a control plane and user plane of a radio interface protocol between one user equipment and E-UTRAN which is based on the 3GPP radio access network standard;

FIG. 25 is a reference diagram illustrating presence of two DMRSs per SA in an extended CP according to the present invention;

DETAILED DESCRIPTION OF THE INVENTION

Figure 1:
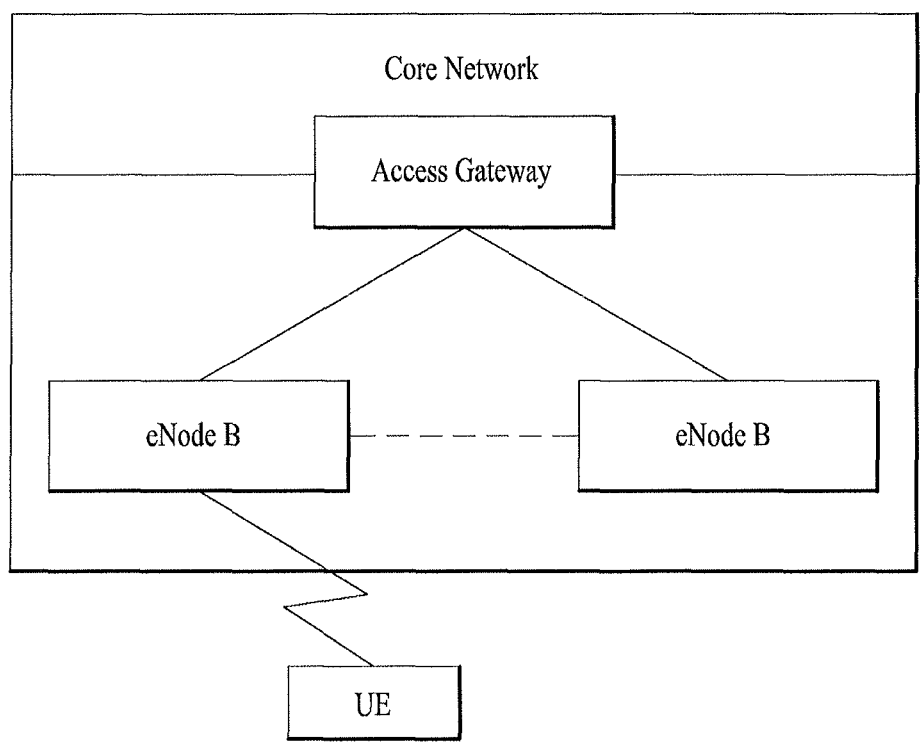
FIG. 1 illustrates an E-UMTS network structure as an example of a wireless communication system.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through radio technologies such as universal terrestrial radio access (UTRA) or CDMA2000. TDMA may be embodied through radio technologies such as global system for mobile communication (GSM)/general packet radio service (GPRS)/enhanced data rates for GSM evolution (EDGE). OFDMA may be embodied through radio technologies such as IEEE 802.11 (Wi-Fi), IEEE 802.16 (WiMAX), IEEE 802-20, and evolved UTRA (E-UTRA). UTRA is a part of the universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE.

For clarity, the following description mainly focuses on 3GPP LTE/LTE-A, but technical features of the present invention are not limited thereto. It should be noted that specific terms used in the description below are intended to provide better understanding of the present invention, and these specific terms may be changed to other forms within the technical spirit of the present invention.

FIG. 2 illustrates a control plane and user plane of a radio interface protocol between one user equipment and E-UTRAN which is based on the 3GPP radio access network standard. The control plane refers to a path through which control messages, which are used by the user equipment (UE) and a network to manage calls, are transmitted. The user plane refers to a path through which data generated on an application layer is transmitted. The data includes, for example, audio data or Internet packet data.

A physical layer, which is a first layer, provides an information transfer service to a higher layer using a physical channel. The physical layer is connected to a media access control (MAC) layer, which is a higher layer, via a transmission channel (a transmit antenna port channel). Data is transferred between the MAC layer and the physical layer via the transmission channel. Data is also transferred between the physical layer of a transmitter and the physical layer of a receiver via a physical channel. The physical channel uses time and frequency as radio resources. Specifically, the physical channel is modulated using an OFDMA scheme on DL and is modulated using a SC-FDMA scheme on UL.

The MAC layer, which is a second layer, provides a service to a radio link control (RLC) layer, which is a higher layer, via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information to ensure efficient transmission of an Internet protocol (IP) packet such as an IPv4 or IPv6 packet in a radio interface having a narrow bandwidth.

A radio resource control (RRC) layer located at the lowermost portion of a third layer is defined only in the control plane. The RRC layer is responsible for controlling logical channels, transmission channels and physical channels in relation to configuration, re-configuration and release of radio bearers. A radio bearer refers to a service provided by the second layer to transfer data between the UE and the network. To this end, the RRC layer of the UE and the RRC layer of the network exchange RRC messages. The UE is in an RRC connected mode if an RRC connection has been established between the RRC layer of the UE and the RRC layer of the network. Otherwise, the UE is in an RRC idle mode. A non-access stratum (NAS) layer located at a higher level than the RRC layer performs functions such as session management and mobility management.

One cell constituting an eNB is configured to use one of bandwidths of 1.4, 3, 5, 10, and 20 MHz to provide a DL or UL transmission service to multiple UEs. Different cells may be configured to provide different bandwidths.

DL transmission channels for transmitting data from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH, or may be transmitted through a separate DL multicast channel (MCH). Meanwhile, UL transmission channels for transmitting data from the UE to the network include a random access channel (RACH) for transmitting initial control messages and a UL SCH for transmitting user traffic or control messages. Logical channels, which are located at a higher level than the transmission channels and mapped to the transmission channels, include a broadcast control channel (BCCH), a paging control channel (PCCH), a common control channel (CCCH), a multicast control channel (MCCH), and a multicast traffic channel (MTCH).

Figure 3:
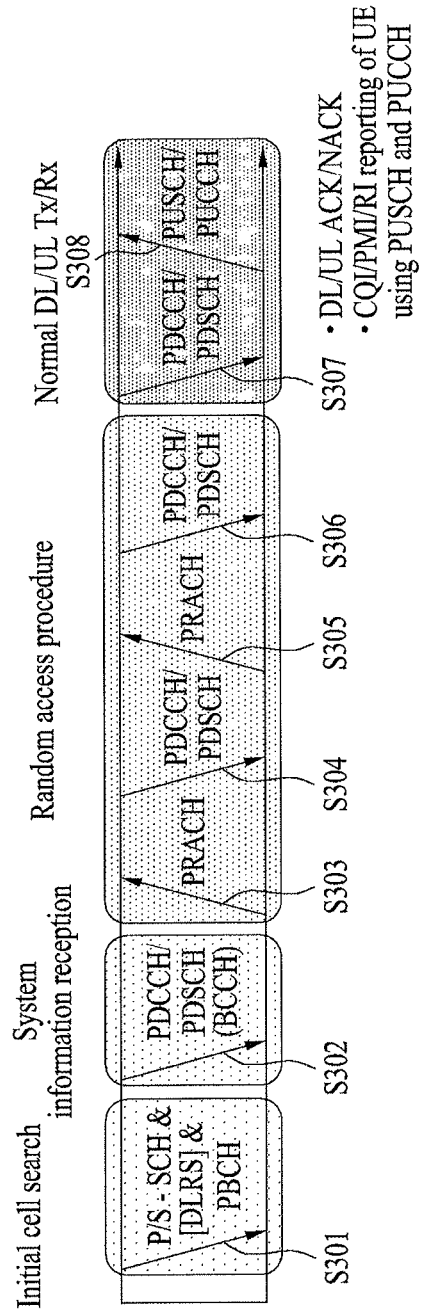
FIG. 3 illustrates physical channels used in a 3GPP LTE system and a general method for transmitting signals using the same.

FIG. 3 illustrates physical channels used in a 3GPP LTE system and a general method for transmitting signals using the same.

A UE performs the initial cell search procedure such as establishment of synchronization with an eNB in step S301 when power is turned on or the UE enters a new cell. To this end, the UE may receive a primary synchronization channel (P-SCH) and a secondary synchronization channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a downlink reference signal (DL RS) in the initial cell search step to confirm a DL channel state.

Upon completing the initial cell search, the UE may receive a physical downlink control channel (PDCCH) and a physical downlink shared channel (PDSCH) according to information carried on the PDCCH to acquire more detailed system information in step S302.

Thereafter, the UE may perform a random access procedure in steps S303 to S306 to complete access to the eNB. To this end, the UE may transmit a preamble through a physical random access channel (PRACH) (S303), and receive a response message to the preamble through a PDCCH and a PDSCH corresponding thereto (step S304). In the case of a contention-based random access, a contention resolution procedure such as transmission of an additional PRACH (S305) and reception of a PDCCH and a PDSCH corresponding thereto (S306) may be performed.

After performing the above procedure, the UE may receive a PDCCH/PDSCH (S307) and transmit a physical uplink shared channel (PUSCH)/physical uplink control channel (PUCCH) (S308) according to a general UL/DL signal transmission procedure. Control information which the UE transmits to the eNB is referred to as uplink control information (UCI). The UCI includes a hybrid automatic repeat and request (HARQ) acknowledgement (ACK)/negative ACK (HACK), a scheduling request (SR) and channel state information (CSI). In the present disclosure, the HARQ ACK/NACK is simply referred to as HARQ-ACK or ACK/NACK (A/N). HARQ-ACK includes at least one of positive ACK (simply, ACK), negative ACK (simply, NACK), discontinuous transmission (DTX), and NACK/DTX. The CSI includes a channel quality indicator (CQI), a precoding matrix index (PMI), and a rank indicator (RI). The UCI, which is generally transmitted over a PUCCH, may be transmitted over a PUSCH if control information and traffic data need to be transmitted simultaneously. The UCI may be transmitted aperiodically over the PUSCH according to a request/command from a network.

Figure 4:
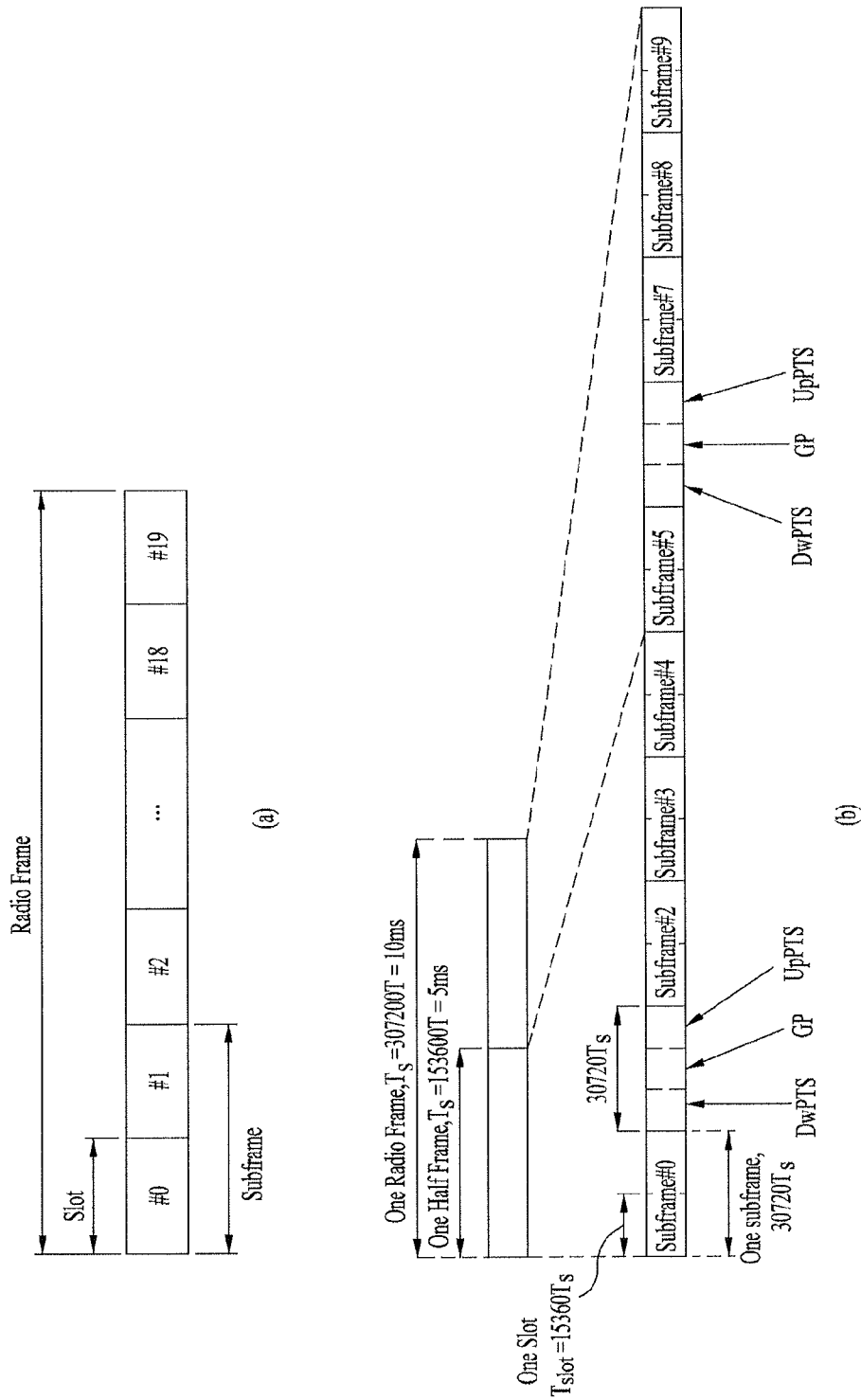
FIG. 4 is a diagram illustrating the structure of a radio frame used in an LTE system.

FIG. 4 is a diagram illustrating the structure of a radio frame used in an LTE system.

Referring to FIG. 4, in a cellular OFDM wireless packet communication system, an uplink (UL)/downlink (DL) data packet is transmitted on a SF-by-SF basis, and one SF is defined as a predetermined time period including a plurality of OFDM symbols. 3GPP LTE supports radio frame structure type 1 applicable to frequency division duplex (FDD) and radio frame structure type 2 applicable to time division duplex (TDD).

FIG. 4(a) illustrates radio frame structure type 1. A DL radio frame is divided into 10 SFs. Each SF includes two slots in the time domain. The transmission duration of one SF is defined as a transmission time interval (TTI). For example, one SF may have a duration of 1 ms, and one slot may have a duration of 0.5 ms. One slot include a plurality of OFDM symbols in the time domain and a plurality of resource blocks (RBs) in the frequency domain. Since 3GPP LTE employs OFDMA for downlink, an OFDM symbol represents one symbol period. The OFDM symbol may be referred to as an SC-FDMA symbol or symbol period. An RB, which is a resource allocation unit, may include a plurality of consecutive subcarriers in one slot.

The number of OFDM symbols included in one slot depends on the configuration of a cyclic prefix (CP). CPs include an extended CP and a normal CP. For example, when OFDM symbols are configured by the normal CP, each slot may include 7 OFDM symbols. When OFDM symbols are configured by the extended CP, the duration of each OFDM symbol is extended and thus the number of OFDM symbols included in one slot is smaller than when the symbols are configured by the normal CP. For the extended CP, each slot may include, for example, 6 OFDM symbols. When the channel state is unstable as in the case of fast movement of a UE, the extended CP may be used to further attenuate inter-symbol interference.

When the normal CP is used, each slot includes 7 OFDM symbols, and thus each SF includes 14 OFDM symbols. In this case, the first two or three OFDM symbols of each SF may be allocated to a physical downlink control channel (PDCCH) and the other OFDM symbols may be allocated to a physical downlink shared channel (PDSCH).

FIG. 4(b) illustrates radio frame structure type 2. A type-2 radio frame includes two half frames, each of which includes four normal SFs each including two slots and a special SF including a DL pilot time slot (DwPTS), a guard period (GP), and a UL pilot time slot (UpPTS).

In the special SF, The DwPTS is used for initial cell search, synchronization, or channel estimation in a UE, whereas the UpPTS is used for channel estimation and UL transmission synchronization with a UE in an eNB. That is, the DwPTS is used for DL transmission, and the UpPTS is used for UL transmission. In particular, the UpPTS is used for transmission of a PRACH preamble or a sounding reference signal (SRS). The GP is intended to cancel UL interference between DL and UL caused by multi-path delay of a DL signal.

The current 3GPP standard defines the special SF as shown in Table 1 given below. Table 1 shows the DwPTS and the UpPTS when $T_s=1/(15000\times2048)$. In this case, the remaining region is configured as the GP.

(i.e., the first slot of SF #0) and slot #10 (i.e., the first slot of SF #5) in every radio frame. The S-SCH is positioned on the OFDM symbols immediately before the last OFDM symbols of slot #0 and slot #10 in every radio frame. The S-SCH and the P-SCH are positioned on OFDM symbols adjacent to each other. In frame structure type-2 (i.e., TDD), the P-SCH is transmitted on the third OFDM symbols of SF #1/#6, and the S-SCH is positioned on the last OFDM symbols of slot #1 (i.e., the second slot of SF #0) and slot #11 (i.e., the second slot of SF #5). The P-BCH is transmitted every four radio frames in both frame structure types, using the first to fourth OFDM symbols of the second slot of SF #0.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Meanwhile, in the radio frame structure type 2, namely the LTE TDD system, UL/DL SF configurations are given as shown below in Table 2.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D indicates a DL SF, U indicates a UL SF, and S indicates a special SF. Table 2 also shows an UL-DL switching periodicities in the uplink/downlink SF configurations in each system.

The radio frame structures described above are simply illustrative. The number of SFs included in a radio frame, the number of slots including in a SF, the number of symbols included in a slot may be changed.

Figure 5:
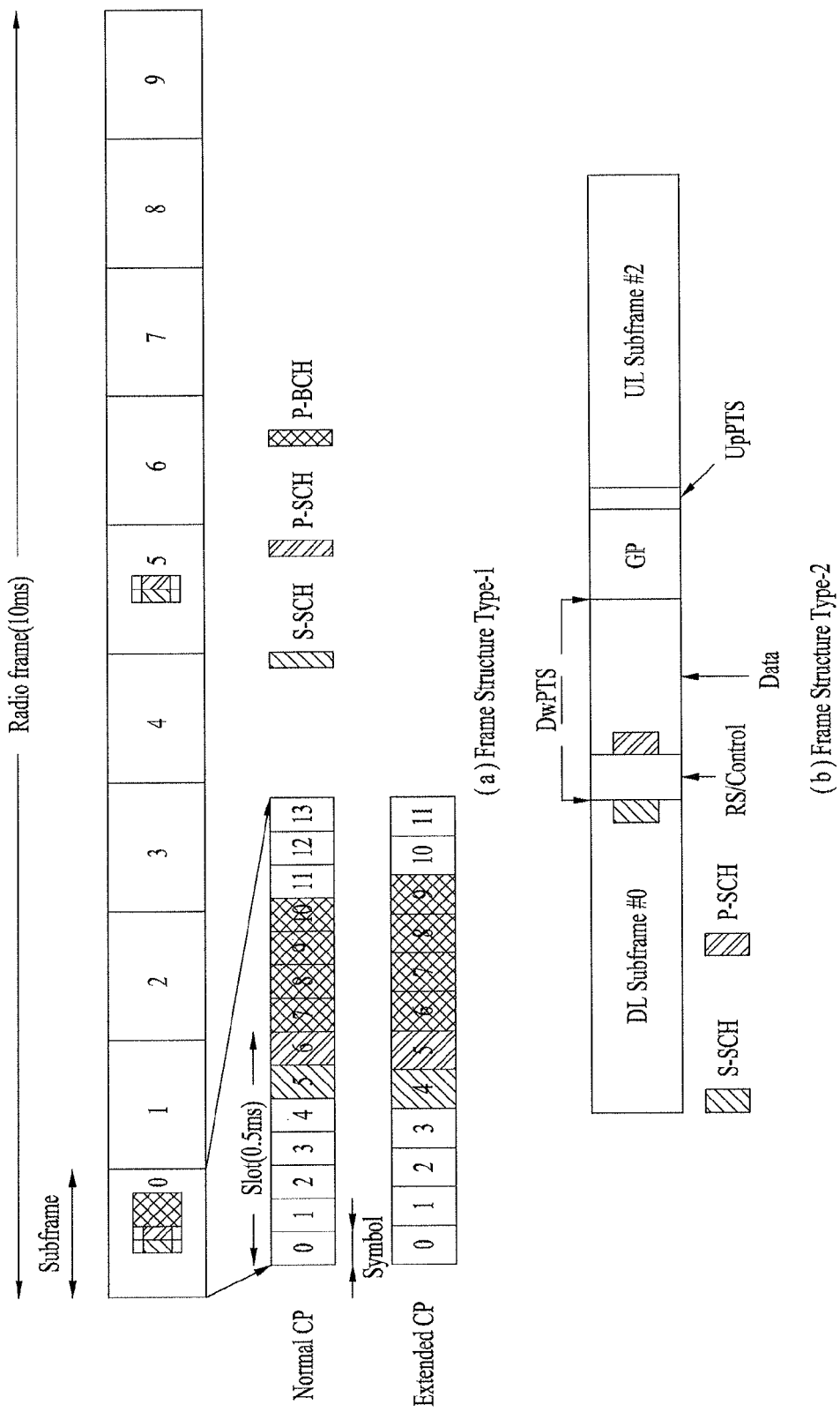
FIG. 5 illustrates a primary broadcast channel (P-BCH) and synchronization channel (SCH) of an LTE system.

FIG. 5 illustrates a primary broadcast channel (P-BCH) and synchronization channel (SCH) of an LTE system. The SCH includes a P-SCH and an S-SCH. A primary synchronization signal (PSS) is transmitted on the P-SCH, and a secondary synchronization signal (SSS) is transmitted on the S-SCH.

Referring to FIG. 5, in frame structure type-1 (i.e., FDD), the P-SCH is positioned on last OFDM symbols of slot #0

The P-SCH is transmitted using 72 subcarriers (including 10 reserved subcarriers and 62 subcarriers used for PSS transmission) with a direct current (DC) subcarrier at the center within a corresponding OFDM symbol. The S-SCH is transmitted using 72 subcarriers (including 10 reserved subcarriers and 62 subcarriers used for SSS transmission) with a DC subcarrier at the center within a corresponding OFDM symbol. The P-BCH is mapped to 72 subcarriers with four OFDM symbols and a DC subcarrier at the center in one SF.

Figure 6:
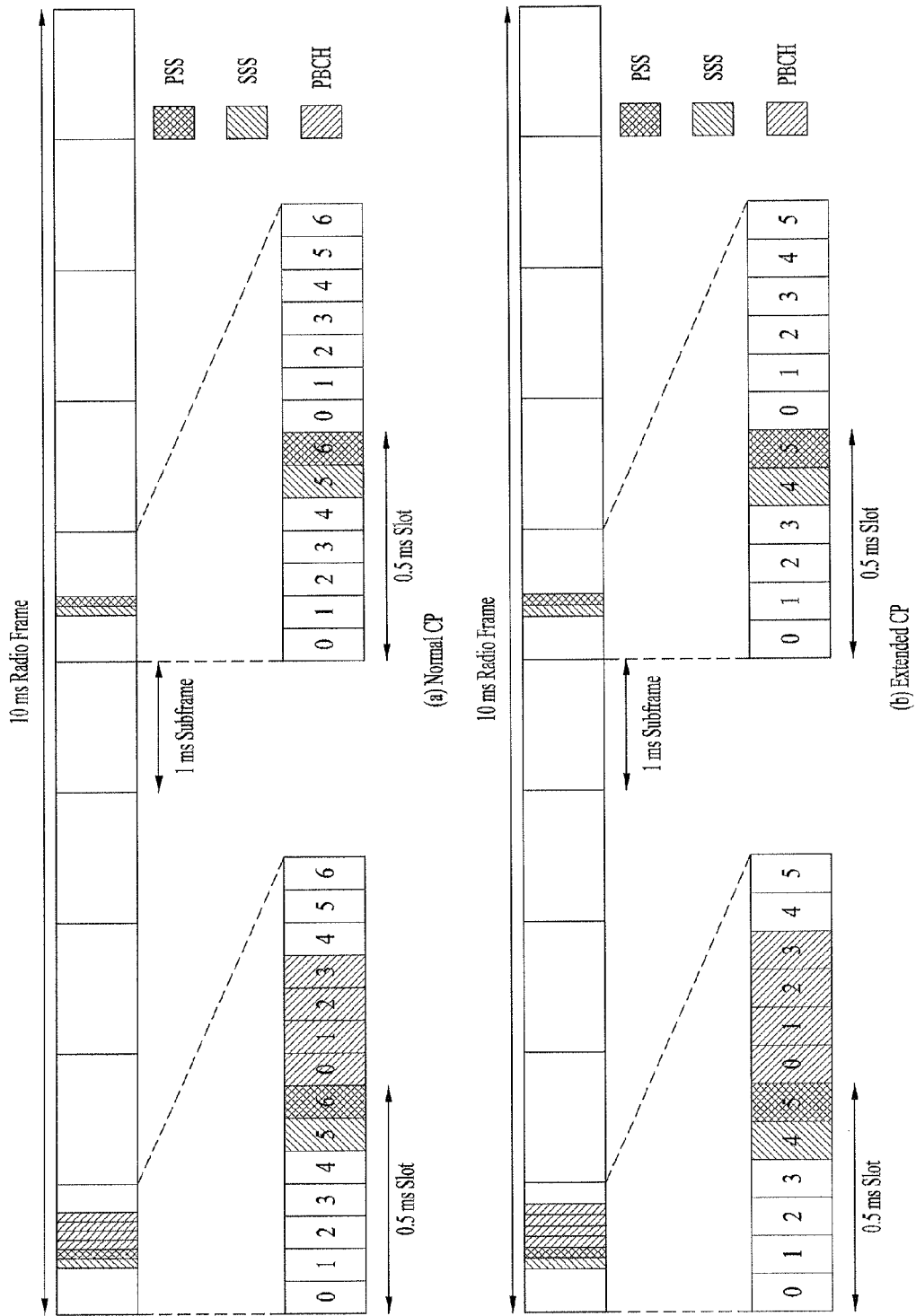
FIG. 6 illustrates radio frame structures for transmitting a synchronization signal (SS)

FIG. 6 illustrates radio frame structures for transmitting a synchronization signal (SS). In particular, FIG. 6 shows examples of radio frame structures for transmission of an SS and a PBCH in frequency division duplex (FDD). FIG. 6(a) shows transmission locations of the SS and the PBCH in a radio frame configured in a normal CP, and FIG. 6(b) shows transmission locations of the SS and the PBCH in a radio frame configured in an extended CP.

A UE performs the initial cell search procedure including acquisition of time and frequency synchronization with the cell and detection of a physical cell ID of the cell. To this end, the UE may receive, from the eNB, synchronization signals, for example, a primary synchronization signal (PSS) and a secondary synchronization signal (SSS), establish synchronization with the eNB, and acquire information such as a cell ID.

The SS will be described in more detail with reference to FIG. 6. SSs are divided into a PSS and an SSS. The PSS is used to obtain time domain synchronization such as OFDM symbol synchronization and slot synchronization and/or frequency domain synchronization, and the SSS is used to obtain frame synchronization, a cell group ID and/or a CP configuration (i.e., usage information on the normal CP or extended CP) of a cell. Referring to FIG. 6, the PSS and the SSS are transmitted on two OFDM symbols in every radio frame. Specifically, SSs are transmitted on the first slot of SF 0 and the first slot of SF 5 in consideration of a Global System for Mobile communication (GSM) frame length, 4.6 ms, for facilitation of inter radio access technology (RAT) measurement. In particular, the PSS is transmitted on the last OFDM symbol of the first slot of SF 0 and the last OFDM symbol of the first slot of SF 5, and the SSS is transmitted on the second last OFDM symbol of the first slot of SF 0 and the second last OFDM symbol of the first slot of SF 5. The boundary of a corresponding radio frame may be detected through the SSS. The PSS is transmitted on the last OFDM symbol of a corresponding slot, the SSS is transmitted on the immediately before the OFDM symbol of the PSS. The transmission diversity of the SS uses only a single antenna port, and is not separately defined in the standard. That is, a single antenna port transmission scheme or a transmission scheme transparent to the UE (e.g., precoding vector switching (PVS), time switched diversity (TSTD), and cyclic delay diversity (CDD)) may be used for transmission diversity of the SS.

The SSs may represent 504 unique physical layer cell IDs through combinations of 3 PSSs and 168 SSs. In other words, the physical layer cell IDs are grouped into 168 physical-layer cell-ID groups, each of which includes three unique IDs such that each physical layer cell ID becomes a part of only one physical-layer cell-ID group. Accordingly, a physical layer cell ID $N^{cell}_{ID}=3N^{(1)}_{ID}+N^{(2)}_{ID}$ is uniquely defined by $N^{(1)}_{ID}$, which is a number between 0 and 167 indicating physical-layer cell-ID groups, and $N^{(2)}_{ID}$, which is a number between 0 and 2 indicating physical-layer IDs in a physical-layer cell-ID group. The UE may recognize one of the three physical-layer IDs by detecting a PSS, and identify one of 168 physical layer cell IDs associated with the physical-layer ID by detecting an SSS. A Zadoff-Chu (ZC) sequence with a length of 63 is defined in the frequency domain and used as a PSS. For example, the ZC sequence may be defined by the following equation.

$$d_u(n) = e^{-j\frac{\pi u n(n+1)}{N_{ZC}}} \quad \text{Equation 1}$$

Herein, $N_{ZC}=63$, and a sequence element corresponding to a DC subcarrier, i.e., n=31, is punctured.

A PSS is mapped to 6 RBs (=72 subcarriers) close to the center frequency. Among the 72 subcarriers, 9 remaining subcarriers are maintained to carry the value of 0, which facilitates design of a filter for implementing synchronization. To define 3 PSSs, 25, 29, and 34 are uses as values of u in Equation (1). Since u=24 and u=34 have a relationship of conjugate symmetry, two correlations may be performed simultaneously. Herein, the conjugate symmetry refers to a relationship of the following equation.

$d_u(n)=(-1)^n(d_{N_{ZC}-u}(n))^*$, when $N_{ZC}$ is even number $d_u(n)=(d_{N_{ZC}-u}(n))^*$, when $N_{ZC}$ is odd number   Equation 2

Using the property of conjugate symmetry, a one-shot correlator for u=29 and u=34 may be implemented, and the overall amount of computation may be reduced by about 33.3% compared to a case without the conjugate symmetry.

More specifically, the sequence d(n) used for the PSSs is generated from the frequency domain ZC sequence according to the following equation.

$$d_u(n) = \begin{cases} e^{-j\frac{\pi u n(n+1)}{63}} & n = 0, 1, \dots, 30 \\ e^{-j\frac{\pi u(n+1)(n+2)}{63}} & n = 31, 32, \dots, 61 \end{cases} \quad \text{Equation 3}$$

Herein, the ZC root sequence index u is given by the following table.

TABLE 3

| $N^{(2)}$ID | Root index u |
|---|---|
| 0 | 25 |
| 1 | 29 |
| 2 | 34 |

Referring to FIG. 6, the PSS is transmitted every 5 ms, and therefore the UE may recognize that the corresponding SF is one of SF 0 and SF 5 by detecting the PSS, but may not specifically identify the SF as SF 0 or SF 5. Accordingly, the UE is not capable of recognizing a boundary of radio frames with the PSS alone. That is, frame synchronization cannot be acquired with the PSS alone. The UE detects the boundary of radio frames by detecting the SSS transmitted twice with different sequences in one radio frame.

Figure 7:
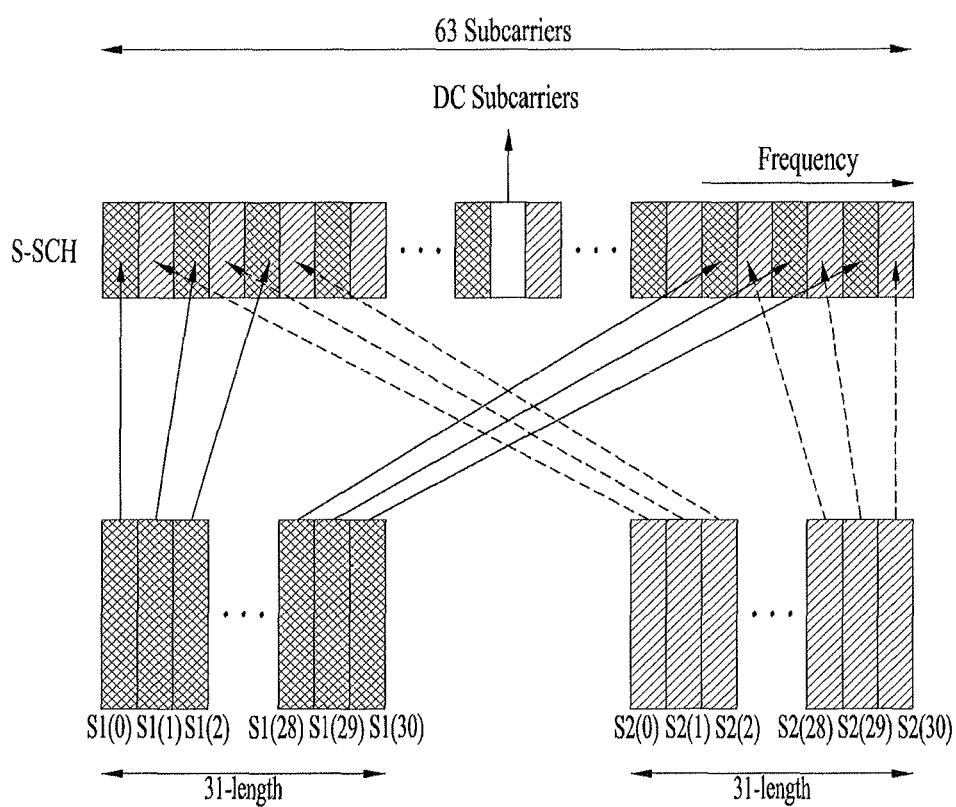
FIG. 7 is a reference diagram illustrating generation of a secondary synchronization signal (SSS)

FIG. 7 is a reference diagram illustrating generation of an SSS. Specifically, FIG. 7 shows mapping of two sequences in the logical domain to the physical domain.

A sequence used for the SSS is an interleaved concatenation of two m-sequences with a length of 31. The concatenated sequence is scrambled by a scrambling sequence given by the PSS. Herein, the m-sequences are a kind of pseudo noise (PN) sequences.

Referring to FIG. 7, when the two m-sequences used to generate an SSS code are defined as S1 and S2 respectively, two different PSS-based sequences are scrambled in the SSS for S1 and S2. In this case, S1 and S2 are scrambled by different sequences. A PSS-based scrambling code may be obtained by applying cyclic shift to an m-sequence generated from a polynomial of $x^5+x^3+1$. 6 sequences are generated by cyclic shift of the m-sequence according to the PSS indexes. Thereafter, S2 is scrambled by an S1-based scrambling code. The S1-based scrambling code may be obtained by applying cyclic shift to an m-sequence generated from a polynomial of $x^5+x^4+x^2+x^1+1$. 8 sequences are generated by cyclic shift of the m-sequence according to the indexes of S1. The code of the SSS is swapped every 5 ms, whereas the PSS-based scrambling code is not swapped. For example, when it is assumed that the SSS of SF 0 carries a cell group ID in the combination of (S1, S2), the SSS of SF 5 carries a sequence in the swapped combination of (S2, S1). Thereby, the 10 ms-radio frame boundary may be distinguished. SSS codes used at this time is generated from a polynomial of $x^5+x^2+1$. Thereby, all 31 codes may be generated through different circular shifts of an m-sequence of length of 31.

The combinations of two m-sequences of length 31 that define the SSS in SF 0 and SF 5 are different from each other. All 168 cell group IDs are expressed according to the combinations of the two m-sequences of length of 31. The m-sequences used as sequences of the SSS are robust in an frequency selective environment. In addition, since the m-sequences can be transformed using fast Hadarmard transform, using the m-sequences for the SSS may reduce the amount of computation needed for the UE to interpret the SSS. Further, as the SSS is configured by two short codes, the amount of computation in the UE may be reduced.

More specifically, regarding generation of an SSS, a sequence d(0), . . . ,d(61) used to generate the SSS is an interleaved concatenation of two binary sequences of length-31. The concatenated sequence is scrambled by a scrambling sequence given by a PSS.

Combinations of the two sequences of length-31 for defining the PSS are given in SF 0 and SF 5 by the following equation.

$$d(2n) = \begin{cases} s_0^{(m_0)}(n)c_0(n) & \text{in subframe 0} \\ s_1^{(m_1)}(n)c_0(n) & \text{in subframe 5} \end{cases}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

Equation 4

Herein, $0 \leq n \leq 30$. Indexes $m_0$ and $m_1$ are derived from the physical-layer cell-ID group $N_{(1)}^{ID}$ according to the following equation.

$$m_0 = m' \bmod 31$$
$$m_1 = (m_0 + \lfloor m'/31 \rfloor + 1) \bmod 31$$
$$m' = N_{ID}^{(1)} + q(q+1)/2,$$
$$q = \left\lfloor \frac{N_{ID}^{(1)} + q'(q'+1)/2}{30} \right\rfloor,$$
$$q' = \lfloor N_{ID}^{(1)}/30 \rfloor$$

Equation 5

Outputs of Equation 5 are listed in Table 4 that comes after Equation 11.

Two sequences $S^{(m0)0}(n)$ and $S^{(m1)1}(n)$ are defined as other two circular shifts of m-sequence s(n) according to the following equation.

$$s_0^{(m0)}(n)=s((n+m_0) \bmod 31)$$

$$s_1^{(m1)}(n)=s((n+m_1) \bmod 31)$$

Equation 6

Herein, $s(i)=1-2x(i)$ $(0 \leq i \leq 30)$ is defined by the following equation with $x(0)=0$, $x(1)=0$, $x(2)$, $x(3)=0$ and $x(4)=1$ as initial conditions.

$$x(\bar{i}+5)=(x(\bar{i}+3)+x(\bar{i})) \bmod 2, \ 0 \leq \bar{i} \leq 25$$

Equation 7

Two scrambling sequences $c_0(n)$ and $c_1(n)$ depends on the PSS, and are defined by two different circular shifts of the m-sequence c(n) according to the following equation.

$$c_0(n)=c((n+N_{ID}^{(2)}) \bmod 31)$$

$$c_1(n)=c((n+N_{ID}^{(2)}+3) \bmod 31)$$

Equation 8

Herein, $N_{ID}^{(2)} \in \{0,1,2\}$ is a physical-layer ID in a physical-layer cell ID group $N_{ID}^{(1)}$, $c(i)=1-2x(i)$ $(0 \leq i \leq 30)$ is defined by the following equation with $x(0)=0$, $x(1)=0$, $x(2)$, $x(3)=0$ and $x(4)=1$ as initial conditions.

$$x(\bar{i}+5)=(x(\bar{i}+3)+x(\bar{i})) \bmod 2, \ 0 \leq \bar{i} \leq 25$$

Equation 9

The scrambling sequences $Z^{(m0)1}(n)$ and $Z^{(m1)1}(n)$ are defined by circular shifts of the m-sequence z(n) according to the following equation.

$$z_1^{(m0)}(n)=z((n+(m_0 \bmod 8)) \bmod 31)$$

$$z_1^{(m1)}(n)=z((n+(m_1 \bmod 8)) \bmod 31)$$

Equation 10

Herein, $m_0$ and $m_1$ are obtained from Table 4 given below after Equation 11, and $z(i)=1-2x(i)$ $(0 \leq i \leq 30)$ is defined by the following equation with $x(0)=0$, $x(1)=0$, $x(2)$, $x(3)=0$ and $x(4)=1$ as initial conditions.

$$x(\bar{i}+5)=(x(\bar{i}+4)+x(\bar{i}+2)+x(\bar{i}+1)+x(\bar{i})) \bmod 2, \ 0 \leq \bar{i} \leq 25$$

Equation 11

TABLE 4

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |

TABLE 4-continued

| $N^{(1)}_{ID}$ | $m_0$ | $m_1$ |
|---|---|---|
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

After determining the time and frequency needed to perform the cell search procedure using the SSS to perform demodulation of a DL signal and transmission of a UL signal at the exact time, the UE may communicate with the eNB only when it acquires system information necessary for configuration of the system of the UE from the eNB.

The system information is configured by a master information block (MIB) and system information blocks (SIBs). Each SIB includes a set of parameters functionally associated with each other. Depending on the parameters included, the blocks are divided into an MIB, SIB Type 1 (SIB1), SIB Type 2 (SIB2), and SIB3 to SIBS. The MIB includes parameters which are essential for the UE to perform initial access to the network of the eNB and are most frequently transmitted. SIB 1 includes not only information on time domain scheduling of the other SIBs but also parameters which are needed to determine whether a specific cell is a cell proper for cell selection.

The UE may receive the MIB over a broadcast channel (e.g., a PBCH). The MIB includes a DL system bandwidth (dl-Bandwidth, DL BW), a PHICH configuration, and a system frame number (SFN). Accordingly, the UE may explicitly recognize information on the DL BW, SFN, PHICH configuration by receiving the PBCH. Information which the UE may implicitly recognize by receiving the PBCH may include the number of transmit antenna ports of the eNB. The information on the number of transmit antenna ports of the eNB is implicitly signaled by masking a sequence corresponding to the number of transmit antennas on a 16-bit cyclic redundancy check used for detection of error in the PBCH (through, for example, XOR operation).

The PBCH is mapped to 4 SFs for 40 ms. The time of 40 ms is blind-detected, and there is no explicit signaling for the time of 40 ms that is separately given. In the time domain, the PBCH is transmitted on OFDM symbols 0 and 3 of slot 1 (the second slot) in SF 0 in a radio frame.

In the frequency domain, the PSS/SSS and PBCH are transmitted only within 6 RBs including 3 RBs on the left side of the DC subcarrier and 3 RBs on the right side of the DC subcarrier, namely 72 subcarriers within corresponding OFDM symbols regardless of the actual system bandwidth. Accordingly, the UE is configured to detect or decode the SS and PBCH regardless of the DL transmission bandwidth configured for the UE.

The UE accessing the network of the eNB after completing the initial cell search may acquire more detailed system information by receiving a PDCCH and a PDSCH according to the information carried on the PDCCH. After performing the procedure described above, the UE may perform PDCCH/PDSCH reception and PUSCH/PUCCH transmission as a typical procedure of UL/DL signal transmission.

Figure 8:
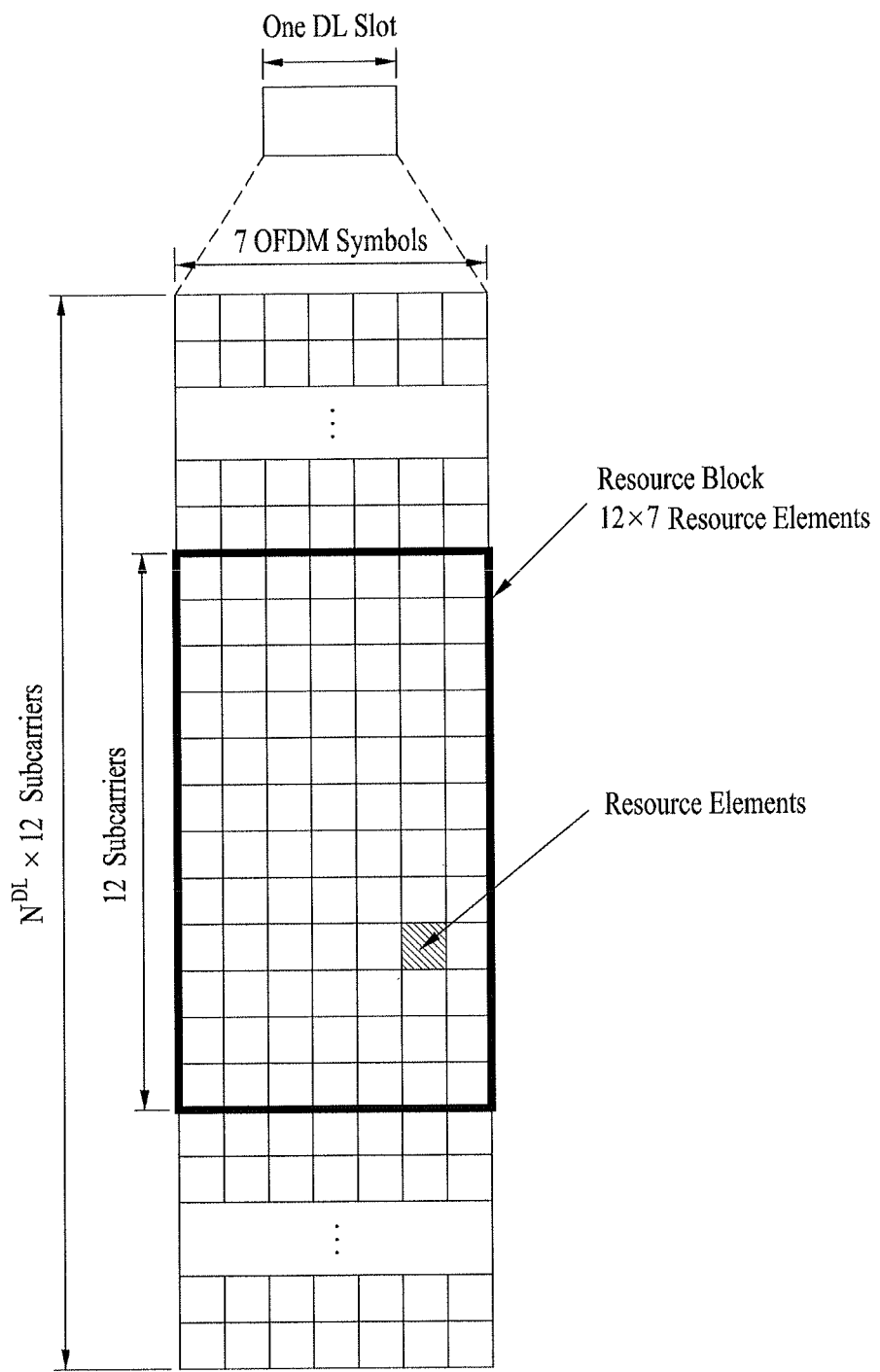
FIG. 8 illustrates a resource grid for a downlink (DL) slot.

FIG. 8 illustrates a resource grid of a DL slot.

Referring to FIG. 8, a DL slot includes $N_{symb}^{DL}$ OFDM symbols in the time domain and $N_{RB}^{DL}$ RBs in the frequency domain. Each RB includes $N_{sc}^{RB}$ subcarriers and thus the DL slot includes $N_{RB}^{DL} \times N_{sc}^{RB}$ subcarriers in the frequency domain. Although FIG. 8 illustrates a case in which a DL slot includes 7 OFDM symbols and an RB includes 12 subcarriers, the present invention is not limited thereto. For example, the number of OFDM symbols included in the DL slot may change according to the CP length.

Each element on the resource grid is referred to as a resource element (RE). One RE is indicated by one OFDM symbol index and one subcarrier index. One RB includes $N_{symb}^{DL} \times N_{sc}^{RB}$ REs. The number of RBs, $N_{RB}^{DL}$, included in a DL slot depends on DL transmission bandwidth configured in a cell.

Figure 9:
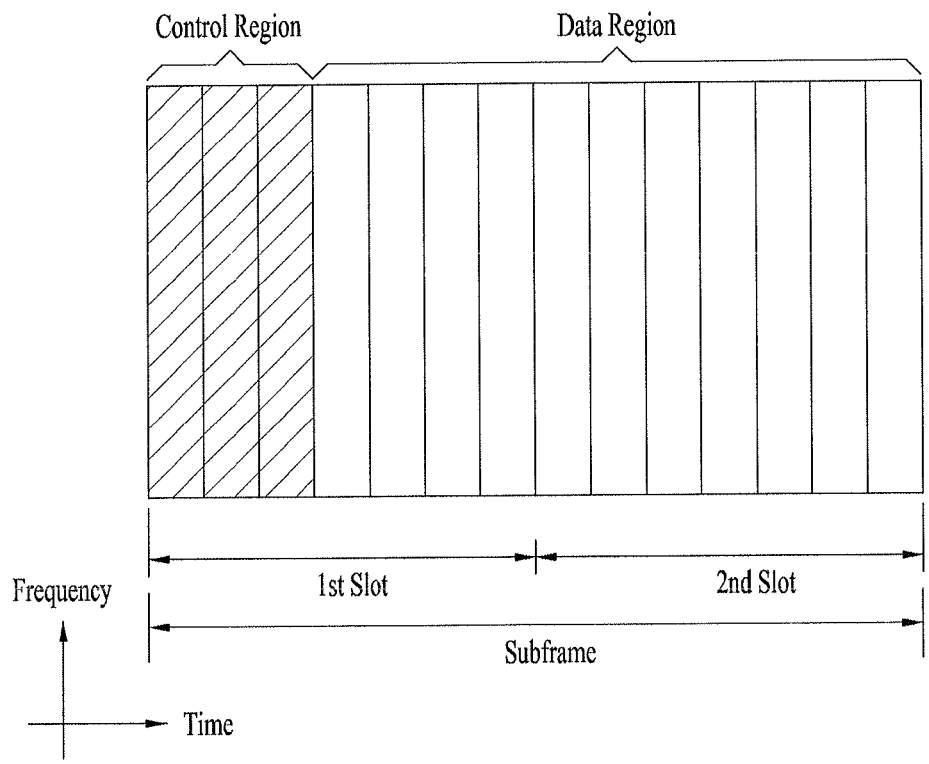
FIG. 9 illustrates the structure of a DL SF.

FIG. 9 illustrates the structure of a DL SF.

Referring to FIG. 9, up to three or four OFDM symbols arranged at the foremost part of the first slot of a DL SF corresponds to a control region to which control channels are allocated. The other OFDM symbols of the DL SF correspond to a data region to which a PDSCH is allocated. Examples of DL control channels used in the LTE system include a physical control format indicator channel (PCFICH), a physical downlink control channel (PDCCH), and a physical hybrid ARQ indicator channel (PHICH). The PCFICH is transmitted in the first OFDM symbol of a SF, carrying information about the number of OFDM symbols used for transmission of control channels in the SF. The PHICH carries a HARQ ACK/NACK signal in response to UL transmission.

Control information carried on the PDCCH is called downlink control information (DCI). The DCI includes resource allocation information and other control information for a UE or a UE group. For example, the DCI includes DL/UL scheduling information and UL transmit (Tx) power control commands.

The PDCCH carries information about resource allocation and a transport format for a downlink shared channel (DL-SCH), information about resource allocation and a transport format for an uplink shared channel (UL-SCH), paging information on a paging channel (PCH), system information on the DL-SCH, resource allocation information of a higher-layer control message such as a random access response transmitted on the PDSCH, a set of Tx power control commands for individual UEs in a UE group, Tx power control commands, and voice over Internet protocol (VoIP) activation indication information. A plurality of PDCCHs may be transmitted in the control region. A UE may monitor a plurality of PDCCHs. A PDCCH is transmitted on an aggregate of one or more consecutive control channel elements (CCEs). A CCE is a logical allocation unit used to provide a PDCCH with a coding rate based on the radio channel state. A CCE corresponds to a plurality of resource element groups (REGs). The format of a PDCCH and the number of bits for the PDCCH are determined according to the number of CCEs. An eNB determines a PDCCH format according to DCI to be transmitted to a UE and attaches a cyclic redundancy check (CRC) to control information. The CRC is masked with an identifier (ID) (e.g. a radio network temporary identifier (RNTI)) according to the owner or purpose of use of the PDCCH. For example, if the PDCCH is destined for a specific UE, the CRC may be masked with a cell-RNTI (C-RNTI) of the specific UE. If the PDCCH carries a paging message, the CRC may be masked with a paging RNTI (P-RNTI). If the PDCCH carries system information (particularly, a system information block (SIB)), the CRC may be masked with a system information RNTI (SI-RNTI). If the PDCCH is designated for a random access response, the CRC may be masked with a random access-RNTI (RA-RNTI).

Figure 10:
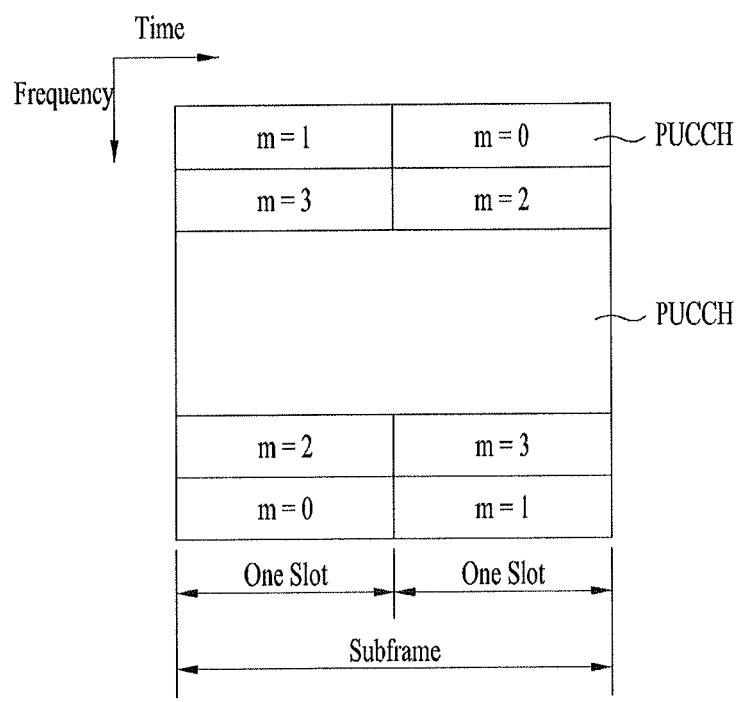
FIG. 10 illustrates the structure of an uplink (UL) SF used in an LTE system.

FIG. 10 illustrates the structure of an uplink (UL) SF used in an LTE system.

Referring to FIG. 10, a UL SF includes a plurality of slots (e.g., 2 slots). A slot may include a different number of SC-FDMA symbols according to the CP length. The UL SF is divided into a control region and a data region in the frequency domain. The data region includes a PUSCH and is used to transmit a data signal such as voice. The control region includes a PUCCH and is used to transmit UCI. The PUCCH includes an RB pair at both ends of the data region in the frequency domain and hops over a slot boundary.

The PUCCH may be used to transmit the following control information.

SR: SR is information requesting UL-SCH resources and is transmitted using on-off keying (OOK).

HARQ ACK/NACK: HARQ ACK/NACK is a response signal to a DL data packet on a PDSCH, indicating whether the DL data packet has been received successfully. 1-bit ACK/NACK is transmitted in a response to a single DL codeword, and 2-bit ACK/NACK is transmitted in a response to two DL codewords.

CSI: CSI is feedback information regarding a DL channel. CSI includes a CQI, and multiple input multiple output (MIMO)-related feedback information includes an RI, a PMI and a precoding type indicator (PTI). 20 bits per SF are used for the CSI.

The amount of UCI that the UE may transmit in a SF depends on the number of SC-FDMA symbols available for transmission of control information. The SC-FDMA symbols available for transmission of control information refer to SC-FDMA symbols in a SF except for SC-FDMA symbols for transmission of RSs. For a SF in which an SRS is configured, the last SC-FDMA symbol of the SF is also excluded from the SC-FDMA symbols available for transmission of control information. The RSs are used for coherent detection of the PUCCH.

Hereinafter, description will be given of a method for D2D Tx UEs performing D2D communication to configure and transmit a scheduling assignment (SA) signal for informing of resources for transmission of data according to a size by which D2D synchronization signals (D2DSS and PD2DSCH) is divided. A receive (Rx) UE may receive the data by receiving the SA signal and identifying the resources for data transmission.

Figure 11:
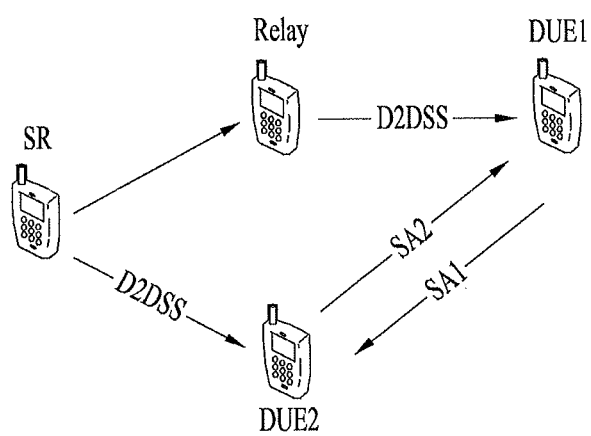
FIG. 11 is a reference diagram illustrating the D2D synchronization procedure.

FIG. 11 is a reference diagram illustrating the D2D synchronization procedure. Referring to FIG. 11, synchronization signals include a D2D synchronization signal (D2DSS) and a physical D2D synchronization channel (PD2DSCH). A synchronization reference (SR) UE and a relay transmits a D2DSS and a PD2DSCH such that D2D Rx UEs acquire synchronization. The D2DSS and the PD2DSCH are usually transmitted together with the same periodicity. However, to save transmit power, the D2DSS may be transmitted with a short periodicity, and the PD2DSCH may be transmitted with a long periodicity.

Figure 12:
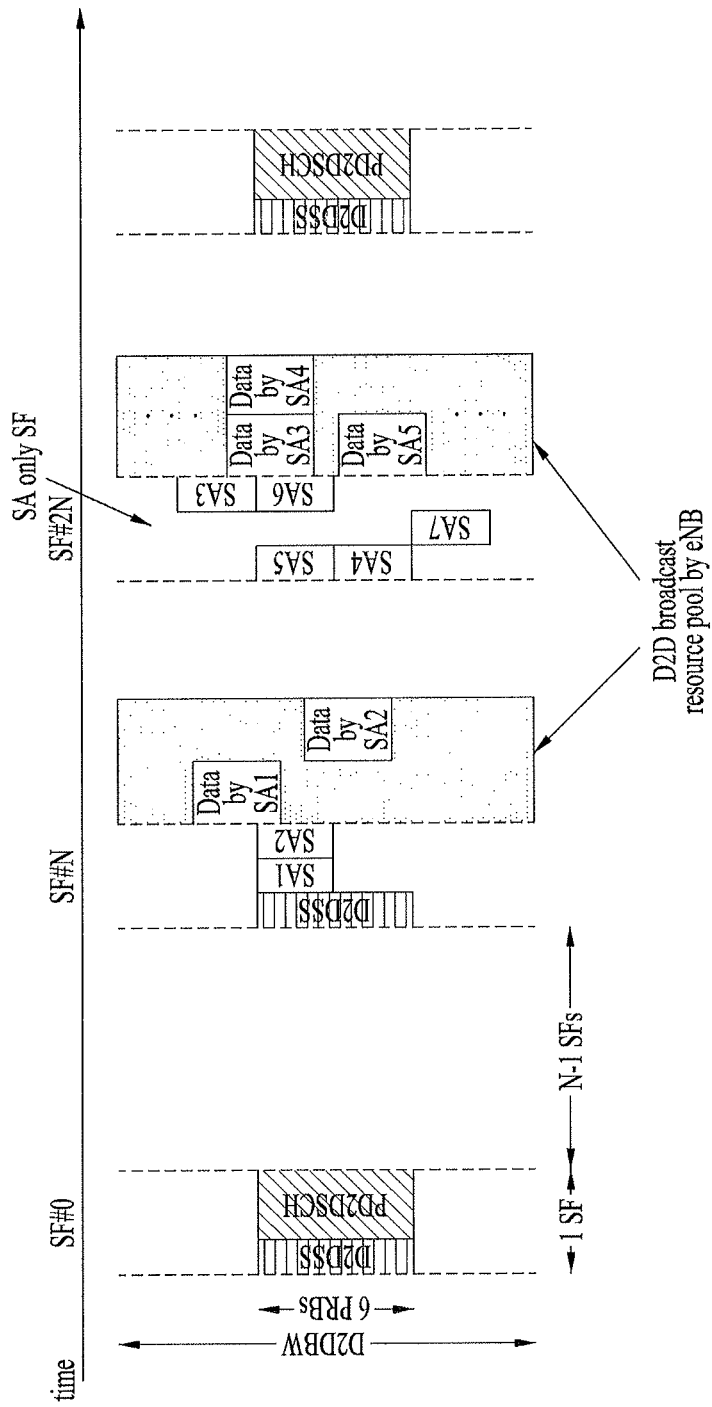
FIG. 12 illustrates a D2DSS and a PD2DSCH transmitted with different periodicities.

FIG. 12 illustrates a D2DSS and a PD2DSCH transmitted with different periodicities. D2D UEs (DUE1, DUE2) having acquired synchronization may transmit an SA signal for informing of where the D2D data for the UEs to receive are assigned in a separate SA subframe (SF) or in a period (an empty PD2DSCH region) in which the PD2DSCH is not transmitted. SF#0 is an SF in which the D2DSS and the PD2DSCH are transmitted together, and SF #N is an SF in which the D2DSS and the SA signal are transmitted together. SF #2N is an SF (SA only SF) in which the SA signal is transmitted in place of the D2DSS. In addition, some or all of the three kinds of SFs may be provided in the D2D broadcast process.

The D2D UEs may receive the SA signal, and then receive and restore a corresponding data signal in a D2D resource pool designated by the eNB or another SR UE/relay.

Hereinafter, description will be given of a method for equally dividing the D2DSS and PD2DSCH regions and using the divided regions in units of an SA signal resource according to an embodiment of the present invention. The SA signal uses the same LTE PUSCH-like structure as that of the PD2DSCH. That is, in order to normally receive the SA, channel estimation is performed through a DMRS as in the case of the PD2DSCH, and only a channel of a corresponding SA unit is selected and decoded using a turbo decoder or a convolutional decoder. If the SA resource unit is configured as a subset of the PD2DSCH, channel estimation hardware (HW)/algorithm used on the PD2DSCH may be reused without changing the structure of the DMRS used on the PD2DSCH. If an SA SF is separately provided, namely if there is no restriction indicating that the D2DSS and the SA signal are transmitted in the same SF, the SA signal may be disposed not only in the PD2DSCH region but also in the D2DSS region.

SA Resource Disposition in PD2DSCH Region

Description of disposition of SA resources in a PD2DSCH region will be given below. A PD2DSCH may have the size of 6 RBs in the frequency domain and a different number of symbols in the time domain depending on the CP length, the number of D2DSSs, the number of DMRSs, an automatic gain control (AGC) symbol, and a transition symbol.

Figure 13:
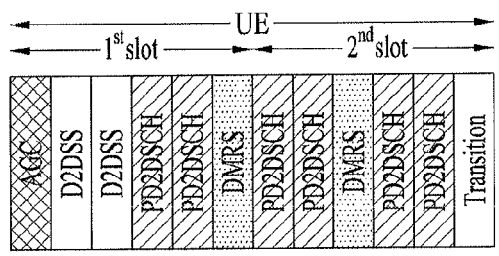
FIG. 13 illustrates use of two D2DSS symbols in an extended CP according to one embodiment.

Table 5 shows possible combinations of the CP length, the number of D2DSSs and the number of DMRSs according to one embodiment of the present invention, and FIG. 13 illustrates use of two D2DSS symbols in an extended CP according to one embodiment. In Table 5 and FIG. 13, the AGC symbol and the transition symbol are preferably located at the foremost and rearmost parts of each SF, whereas the locations to which the D2DSS and the DMRS are assigned may change depending on the configuration of the D2DSS and the DMRS. Details of the present invention are not limited by the location of the PD2DSCH symbol, but are affected by only the number of symbols. However, for simplicity of description, it will be assumed that the AGC symbol and the transition symbol are located at the foremost and rearmost parts of a SF, the D2DSS is located on X symbols after the AGC symbol, two DMRSs are located on any symbols within the SF, and the PD2DSCH is located on the Y symbols in the middle of the SF.

TABLE 5

| CP length | D2DSS (X) | DMRS | AGC & transition | PD2DSCH (Y) |
|---|---|---|---|---|
| Normal (14) | 2 | 2 | 2 | 8 |
| Normal (14) | 3 | 2 | 2 | 7 |

TABLE 5-continued

| CP length | D2DSS (X) | DMRS | AGC & transition | PD2DSCH (Y) |
|---|---|---|---|---|
| Normal (14) | 4 | 2 | 2 | 6 |
| Extended (12) | 2 | 2 | 2 | 6 |
| Extended (12) | 3 | 2 | 2 | 5 |
| Extended (12) | 4 | 2 | 2 | 4 |

First Embodiment

Hereinafter, description will be given of a method for disposing SA resource units along the time axis, namely a symbol division scheme according a first embodiment of the present invention.

When N SAs are transmitted in the time domain, the symbols of the PD2DSCH may be divided into N (N being a natural number greater than 2) sets and the SAs may be assigned to the divided sets. In this case, the assignment methods include assignment of k consecutive symbols to one SA and alternating assignment of K SAs to each symbol.

Figure 14:
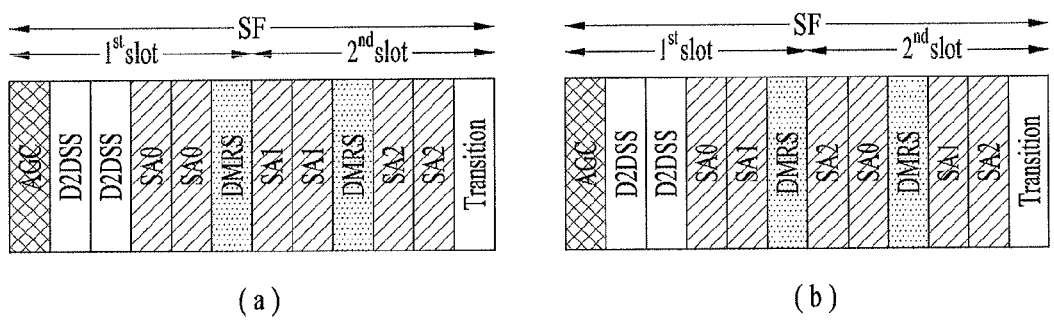
FIG. 14 is a reference diagram for describing an embodiment of the present invention assuming a PD2DSCH including 6 symbols and 3 SAs.

Hereinafter, description will be given in more detail on the assumption that the PD2DSCH is configured on 6 symbols and 3 SAs are provided as shown in FIG. 14. As shown in FIG. 14(a), the symbols may be divided into groups of 2 symbols in a time order and assigned to SA1, SA2, and SA3, respectively. Alternatively, as shown in FIG. 14(b), the SAs may be alternately assigned to the symbols in an order of SA0-SA1-SA2-SA0 . . . .

If the number of symbols cannot be divided by the number N of SA resource units, one symbol may be added to a specific SA resource unit. In selecting an SA resource unit to which a symbol is added (namely, +1 is added), higher priority is set to a resource unit exhibiting lower channel estimation performance. For example, suppose that a 5-symbol PD2DSCH is divided by 2 SA resources and assigned. If SA0 has a 2-symbol size, SA1 may have a 3-symbol size. Since the number of symbols of SA0 is less than that of SA1, SA0 is preferably located on symbols closer to the DMRS. Since SA1 is given a lower coding rate, SA1 may exhibit good decoding performance although it is located on symbols far from the DMRS symbol (e.g., symbols which are disadvantageous for channel estimation).

Figure 15:
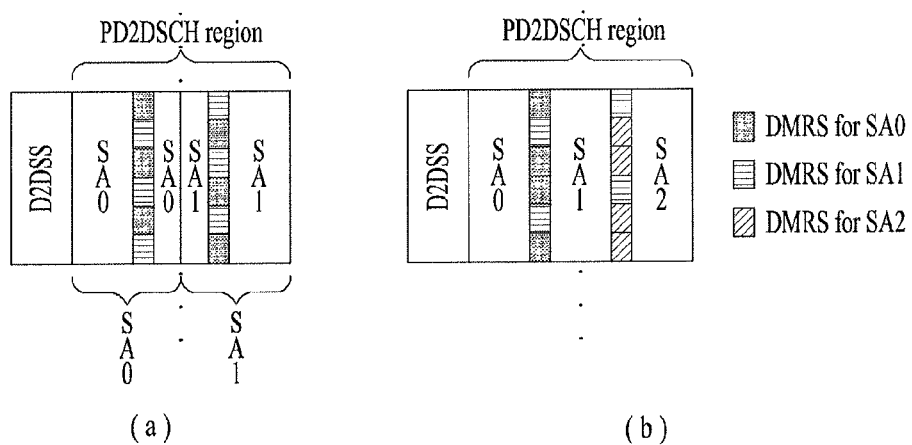
FIGS. 15 and 16 are reference diagrams illustrating PD2DSCH OFDM symbols divided by 2 SA symbols and PD2DSCH OFDM symbols divided by 3 SA symbols according to one embodiment of the present invention.
Figure 16:
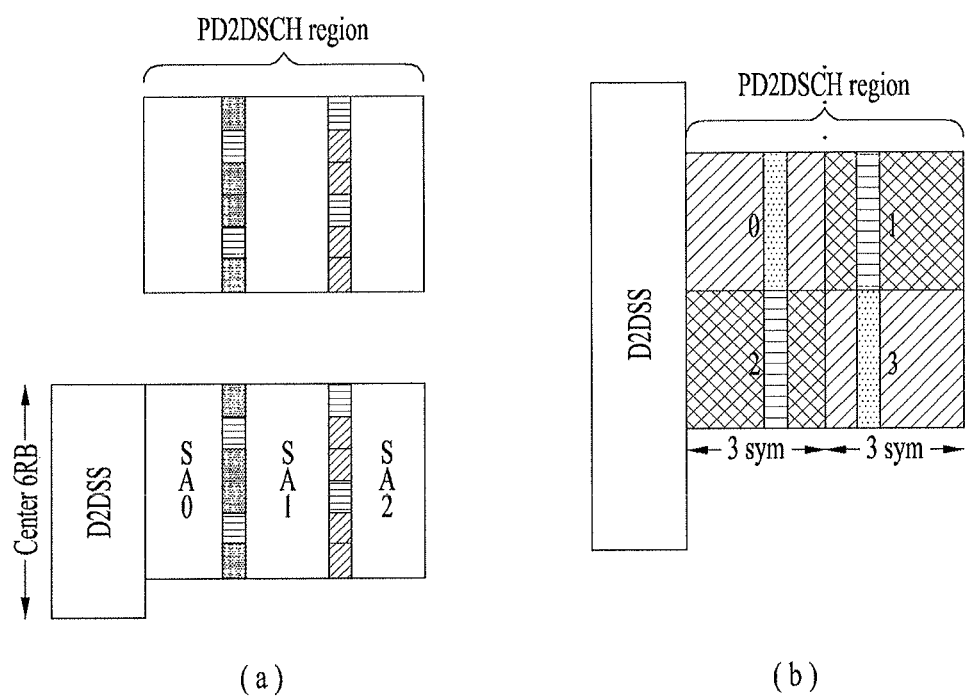

FIGS. 15 and 16 illustrate PD2DSCH OFDM symbols divided by 2 SA symbols and PD2DSCH OFDM symbols divided by 3 SA symbols according to one embodiment of the present invention. While FIG. 15 illustrates center 6RBs having D2DSS for simplicity of description, this embodiment should not be interpreted as being restricted to the RBs having the D2DSSs, namely the center 6RBs. In other words, SAs may be assigned to RBs other than the center RBs. SA regions may be identified by OFDM symbols and RBs (or subcarriers).

Further, to allow for channel estimation for an SA signal, UEs transmitting an SA need to transmit a DMRS signal along with the SA. In this case, the DMRS symbol may be predefined, and thus it is important to overlap the SA and a corresponding DMRS symbol in a code division multiplexing (CDM) scheme or to properly arrange the REs such the REs are orthogonal to each other and assigned to the UEs transmitting the SA. Herein, the DMRS is assumed to be the same sequence as that of a DL PUSCH DMRS of LTE, but some or all of sequence generation parameters (e.g., the type of sequence and root index, length and cyclic shift value) may be changed for D2D.

Figure 17:
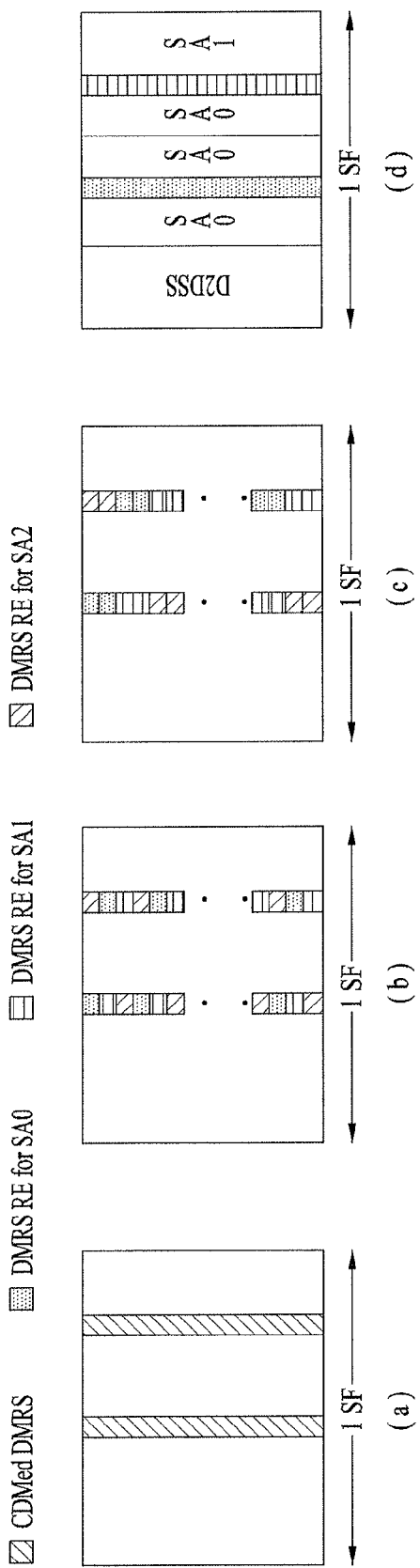
FIGS. 17 and 18 are reference diagrams illustrating assignment of DMRS.

Hereinafter, assignment of the DMRS will be described in more detail with reference to FIG. 17.

As shown in FIG. 17(a), DMRSs may be subjected to CDM on the same resource. That is, a plurality of DMRS may be positioned on the same symbol as in the case of disposition of DMRSs in LTE. The DMRSs may be distinguished from each other by different cyclic shift values.

Alternatively, as shown in FIG. 17(b), DMRS REs may be distributed one by one in an alternating manner. That is, when it is assumed that n SAs are present in the PD2DSCH region, the nk+0-th DMRS RE may be assigned to the DMRS of SA0, and the nk+m-th RE may be assigned to the DMRS of Sam. In this manner, REs may be sequentially assigned one by one. It is advantageous in terms of maximization of channel estimation performance to assign different offsets to the respective DMRS symbols such that the symbols start with different SA indexes.

Alternatively, as shown in FIG. 17(c), a few consecutive RE groups may be distributed in an alternating manner. That is, compared to the method of FIG. 17(b), the DMRS REs may be divided into groups of 2 or 3 consecutive DMRS REs and each group may be assigned to one SA in an alternating order. Similar to the method FIG. 17(b), it is advantageous in terms of maximization of channel estimation performance that the DMRS symbols start with different SA indexes.

Further, when the DMRS REs are assigned to each SA in an alternating manner as shown in FIGS. 17(b) and 17(c), if the location of a specific DMRS is far from the SA in the time axis, the specific DMRS may be omitted or replaced by another SA DMRS. That is, in FIG. 15(b), the first DMRS transmission OFDM symbol consists of DMRSs of SA0 and SA1 In particular, the RE of SA2 is replaced by the DMRS of SA0, as shown in FIGS. 17(b) and 17(c). This is intended to enhance channel estimation performance for SA0 and to prevent degradation of channel estimation performance for SA2 which is relatively far apart. In particular, when 2 SAs are disposed in a time division scheme as shown in FIG. 17(d), one DMRS symbol may be assigned to each SA.

In particular, when one SA uses all PD2DSCH symbols (namely, only one SA is present on a specific RB or a specific subcarrier), an SA resource unit may be divided into PD2DSCH symbol number×K RB units (K subcarrier units). Herein, K has a predefined value. The method of disposing only one SA on a specific RB (or specific subcarrier) has a smaller number REs for transmission per unit symbol than the method of transmitting multiple SAs on different parts of an OFDM symbol, and accordingly enables assignment of greater transmit power to one RE. Therefore, an SA receiving UE may receive the SAs with greater power, and thus rate of success in receiving the SAs may be increased.

Figure 18:
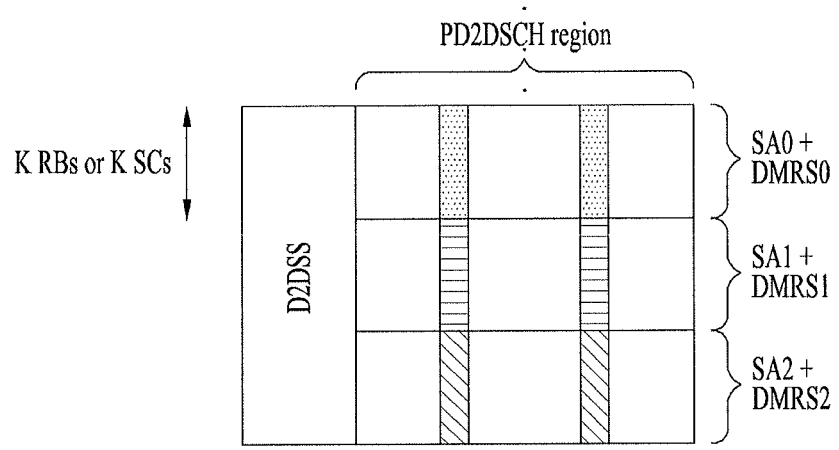

Each UE transmitting an SA needs to transmit a DMRS on an RB on which the SA is transmitted, such that the SA is normally decoded on the receiver. As a method for transmitting DMRSs, a plurality of DMRSs may be subjected to CDM as described above in relation to FIG. 17(a), or the DMRSs may be assigned in RB units (subcarrier units) as shown in FIG. 18.

Second Embodiment

Hereinafter, description will be given of disposing SA resource units in consideration of both the time domain and the frequency domain, namely resource hopping according to a second embodiment of the present invention.

According to the second embodiment, the disposition method along the time axis and the disposition method along the frequency axis may be combined. Thereby, hopping of an SA resource may occur within PD2DSCH OFDM symbols. According to the second embodiment, time and frequency diversities may be enhanced compared to the first embodiment.

Figure 19:
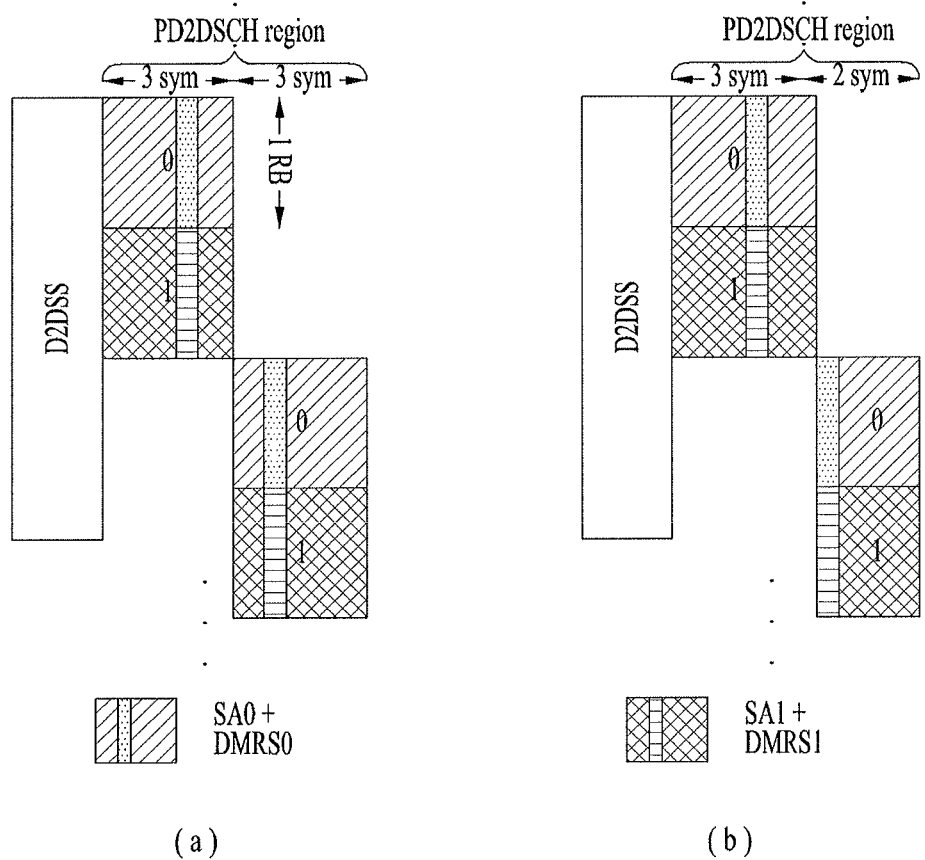
FIG. 19 is a reference diagram illustrating assignment of SA resources in specific resource units according to a second embodiment of the present invention.

FIG. 19 is a reference diagram illustrating assignment of SA resources in specific resource units according to the second embodiment of the present invention. Specifically, as shown in FIG. 19, a resource may be divided into smaller resource units (e.g., 3 symbols×1RB) on a PD2DSCH OFDM symbol and subjected to hopping in a predetermined specific pattern.

Further, in the case of FIG. 19, each RB per SA may basically have one DMRS symbol with regard to DMRS disposition.

Herein, when DMRSs of different SAs are transmitted on different resources, the receiver may distinguish between the DMRSs even if an exactly identical sequence is used. However, when DMRSs of different SAs are arranged to overlap on the same resource in the CDM scheme, the DMRSs of different SAs need to be orthogonal or pseudo orthogonal to each other. To this end, the following methods may be used to generate a DMRS sequence.

A DMRS sequence is i) generated based on a UE ID or ii) operatively connected to a transmission time/frequency resource, or iii) a pseudo orthogonal DMRS sequence may be generated using another method.

The same DMRS sequence may be used, and an indication of a cyclic shift value of the DMRS sequence may be i) received from the eNB or ii) generated based on the UE ID, or iii) a different value may be used in connection with a time/frequency resource.

In addition, the size of an SA resource unit may be set to a predetermined constant value, or may be variable according to SA contents, target coding rate and target coverage. If the size is variable, the size may not be separately signaled to the D2D Rx UE, and the Rx UE may detect the SA through blind decoding for a few SA resource units based on the information received from the D2DSS and PD2DSCH (e.g., an ID of the Tx UE) and the information received via the eNB (e.g., SA subframe number) at an estimated time at which the SA may be present.

Meanwhile, the SF number (SA SF number) of an SF in which the SA is transmitted may be determined based on the location of a resource pool (or a broadcast resource pool) (by, for example, performing inverse operation). The Rx UE may i) receive the SF number of a resource pool through a higher layer signal (e.g., RRC signaling) of the eNB, or ii) receive the SF number of the resource pool on the D2DSS and PD2DSCH of the Tx UE, thereby detecting the SA at the predetermined location (e.g., subtracting a predetermined number from the SF number of the resource candidate, specifically, resource pool SF number-4).

SA Resource Disposition in D2DSS Region

Hereinafter, a method for disposing SA resource units in the D2DSS region will be described.

If there is no restriction indicating that the D2DSS and the SA should be transmitted in one SF, the D2DSS may be replaced by an SA resource, and thus the whole SF may be used for SA transmission. That is, in transmitting the SA, SA resources are not sequentially assigned to the symbols. Instead, PD2DSCH OFDM symbols may be assigned SA resources together and D2DSS OFDM symbols may be assigned SA resources together.

Figure 20:
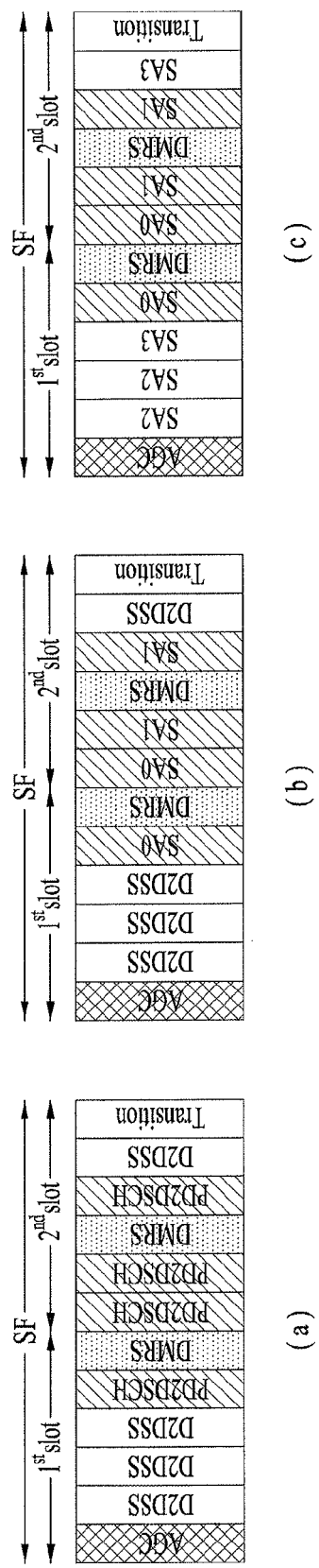
FIG. 20 is a reference diagram illustrating assignment of an SA signal to a D2DSS region according to the embodiment.

FIG. 20 is a reference diagram illustrating assignment of an SA signal to a D2DSS region according to the embodiment. FIG. 20 assumes 4 inconsecutive symbol D2DSSs and 4 consecutive symbol PD2DSCHs (excluding the DMRS symbol). FIG. 20(a) illustrates locations of symbols on which the D2DSSs and the PD2DSCHs are present, and FIG. 20(b) illustrates disposition of SA0 and SA1 signals on PD2DSCH OFDM symbols. FIG. 20(c) illustrates transmission of SA2 and SA3 signals on D2DSS symbols.

Figure 21:
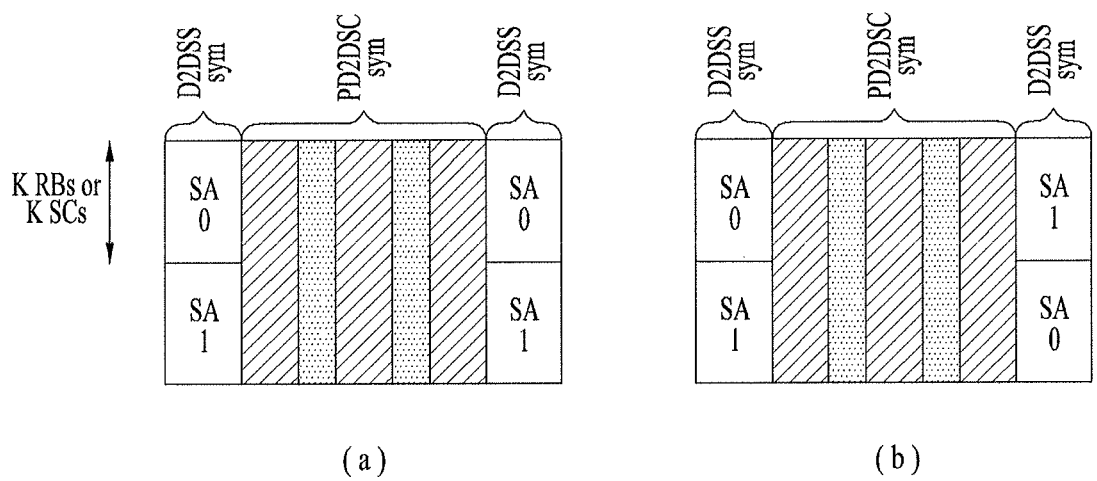
FIG. 21 is a reference diagram illustrating assignment of SAs to D2DSSs.

FIG. 21 is a reference diagram illustrating assignment of SAs to D2DSSs. As shown in FIG. 21(a), all D2DSS OFDM symbols may be occupied by one SA in the D2DSS region, and different SAs may be assigned to RBs or subcarriers in the frequency domain. As shown in FIG. 21(b), a D2DSS OFDM symbol may have a resource to be subject to hopping. Herein, the DMRS for decoding the D2DSS may use the same symbol as the DMRS symbol used on the PD2DSCH. That is, CDM may be performed on the same DMRS symbol. In the case of FIG. 21(b), only one DMRS may be transmitted on each RB (or each subcarrier).

As the method for assigning SA resources, a method used to transmit an SA on a PD2DSCH symbol, for example, i) dividing the SA into symbol units, ii) allowing one SA to use all symbols, or iii) resource hopping is preferably used. If the number of D2DSS OFDM symbols is different from the number of PD2DSCH symbols, however, a method different from the method used to transmit an SA may be used.

In addition, to ensure channel estimation of an SA located on a D2DSS OFDM symbol, a DMRS may be additionally transmitted. In particular, this transmission may be implemented when the number of consecutive symbols of D2DSSs is greater than the number of symbols used for the SA. In this case, each SA signal is transmitted on one DMRS symbol. The receiver may receive the one-symbol DMRS, and decode a corresponding SA signal after performing channel estimation.

Figure 22:
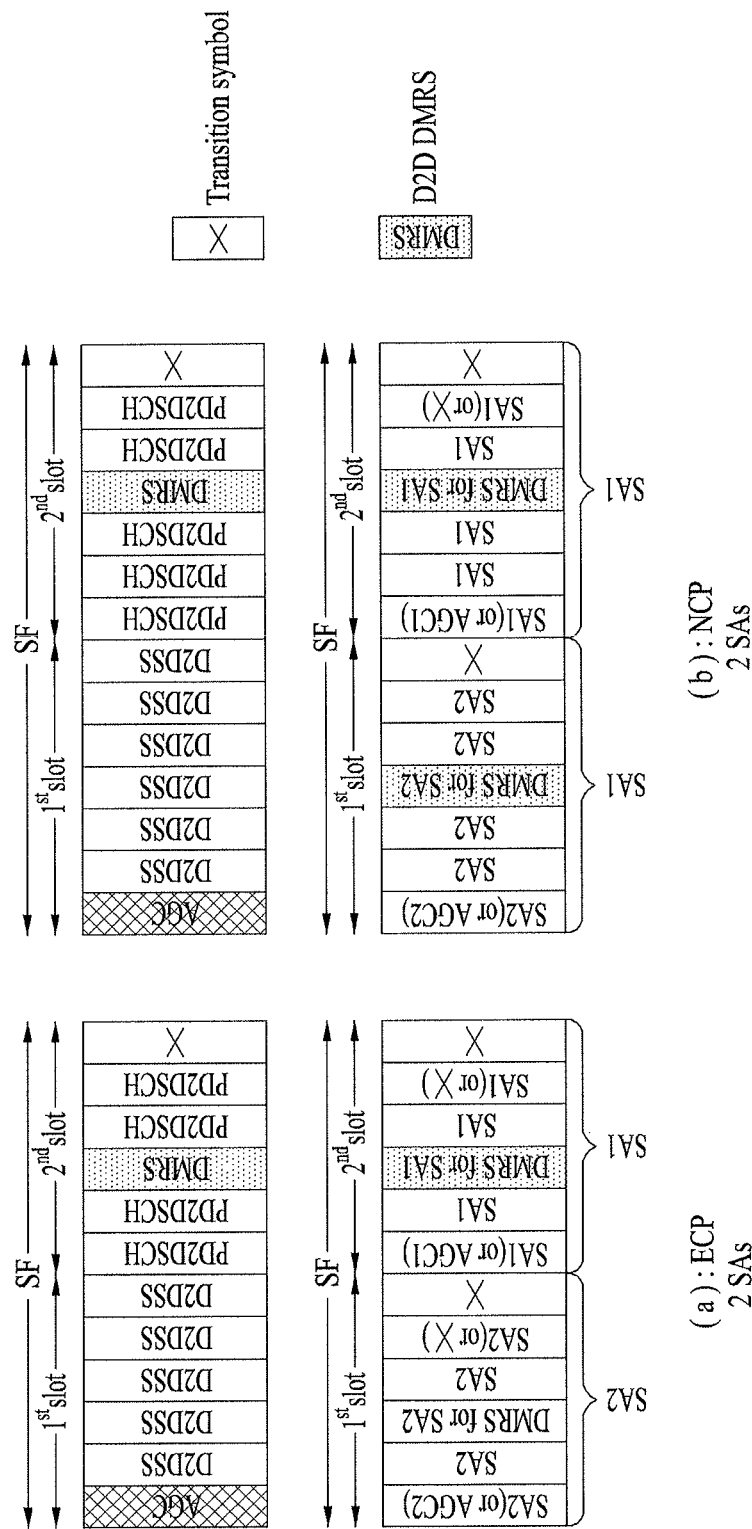
FIG. 22 is a reference diagram illustrating assignment of two SAs to one SF according to the embodiment.

FIG. 22 is a reference diagram illustrating assignment of two SAs to one SF according to the embodiment. FIG. 22(a) illustrates a case of an extended CP, and FIG. 22(b) illustrates a case of a normal CP. If an SF is used to transmit only D2DSS, only SA1 may be assigned to the SF. If the SF is a SF configured to be assigned only an SA (i.e., SA only SF), both SA1 and SA2 may be assigned to the SF.

In this case, the first symbol of each SA is generally mapped to data as an SA symbol. However, when the symbol is used as an AGC symbol, a separate predetermined AGC signal may be transmitted, or the second symbol of the SA may be retransmitted on the symbol. In case that a UE transmitting SA1 receives SA2 or a UE transmitting SA2 receives SA1, a Tx-Rx transition symbol may be present between SA1 and SA2. The Tx-Rx transition symbol may have the size of one or two symbols.

Figure 23:
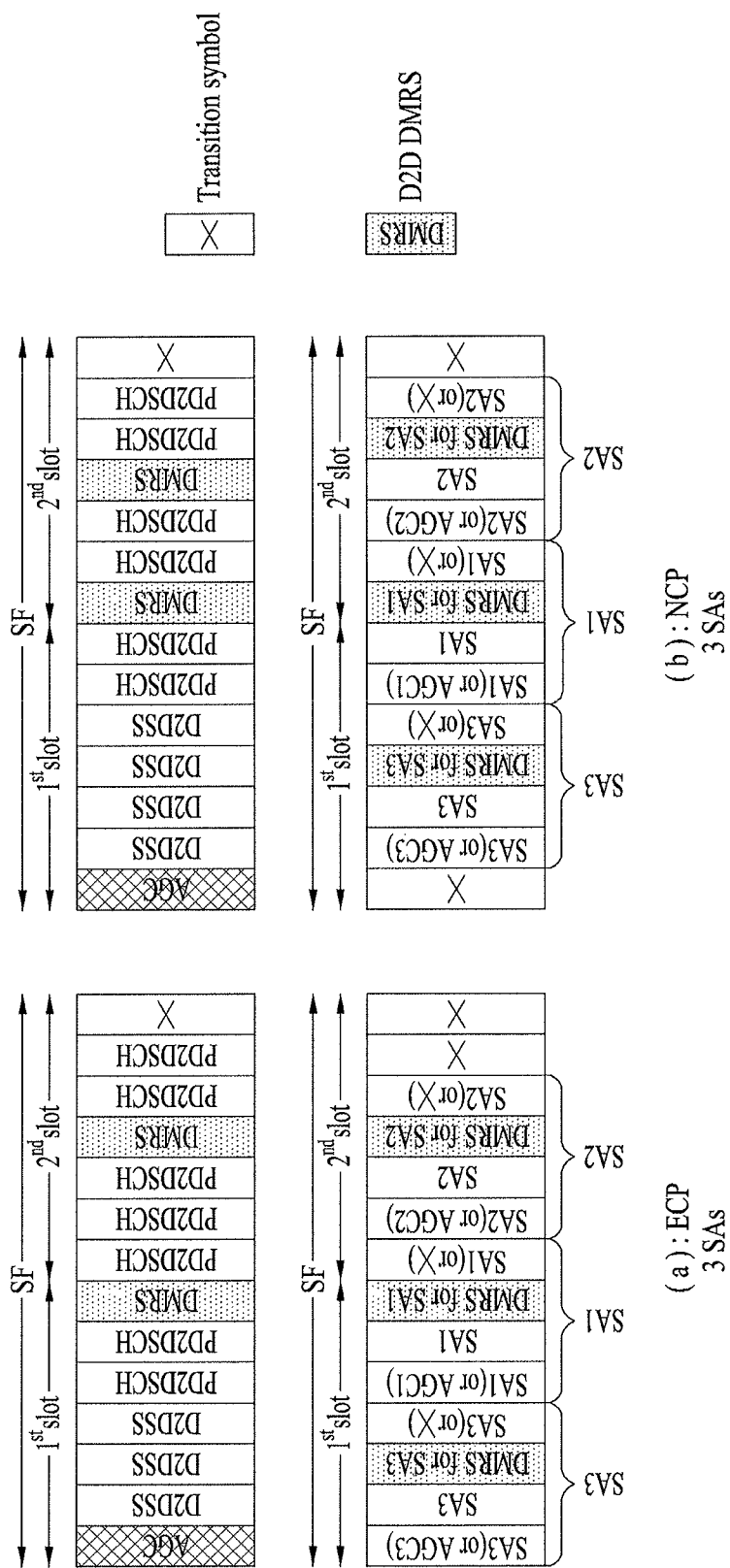
FIG. 23 is a reference diagram illustrating transmission of three SAs in one SF according to the embodiment.

FIG. 23 is a reference diagram illustrating transmission of three SAs in one SF according to the embodiment. Transmission of three SAs requires three DMRS symbols, and thus may be performed in the normal CP which has a relatively sufficient number of symbols. In an SF in which the SAs and a D2DSS are transmitted together, only SA1 and SA2 will be transmitted. In an SF (SA only SF) configured to allow only the SAs to be transmitted, SA1, SA2 and SA3 may all be transmitted. FIG. 23(a) illustrates a case in which two D2D-WAN transition symbols are located at the last part of an SF, and FIG. 23(b) illustrates a case in which two D2D-WAN transition symbols are located at the foremost part and rearmost part of the SF, respectively. Similar to the example of FIG. 22, the first symbol of each SA may be used to transmit a separate AGC signal or mapped to a value equal that of the second symbol. In addition, if data is assigned to the last symbol of each SA, a UE transmitting an SA cannot receive SAs of other UEs in the same SF. In contrast, if the last symbol of each SA is configured as one transition symbol, the UE transmitting the SA may receive another SA.

Figure 24:
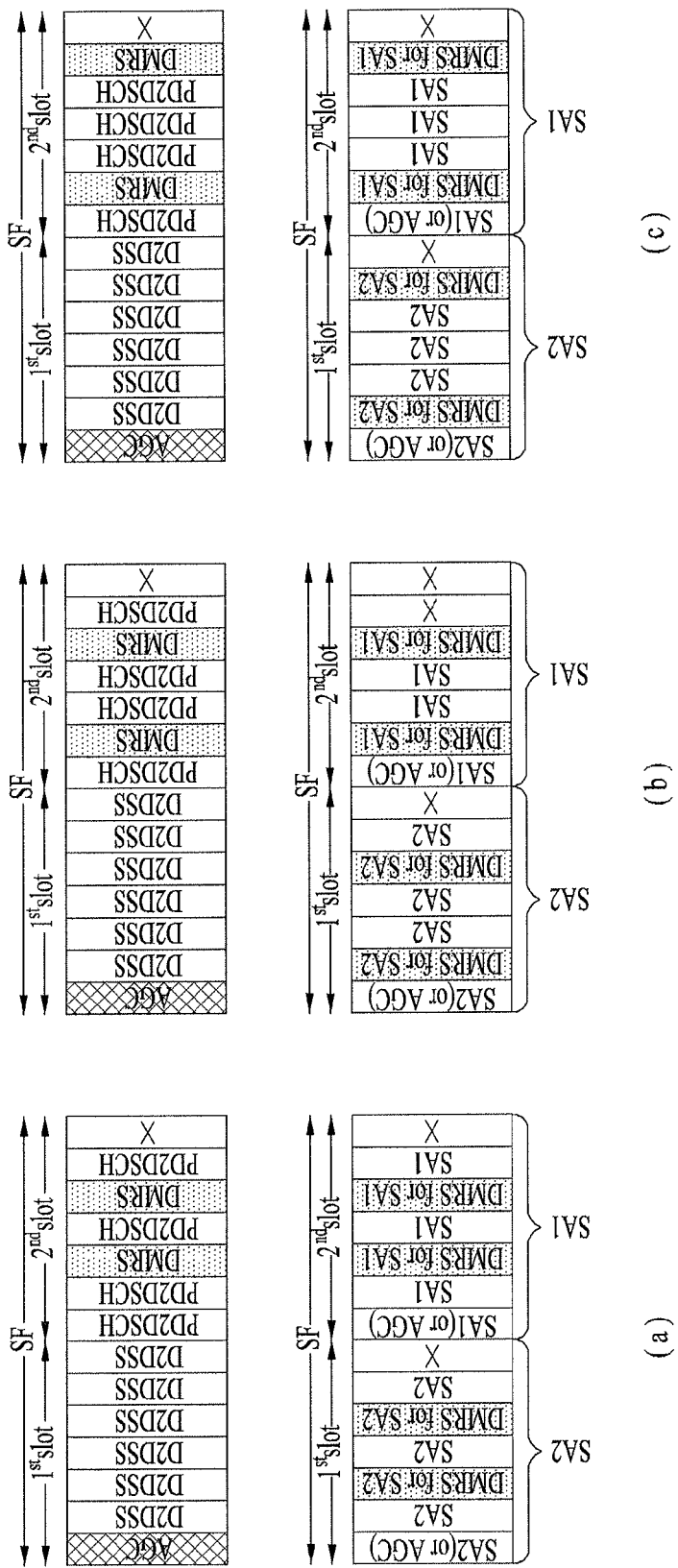
FIG. 24 is a reference diagram illustrating two DMRSs present in one SA in a normal CP according to the embodiment.

FIG. 24 is a reference diagram illustrating a case in which two DMRSs are present in one SA in a normal CP according to the embodiment.

In FIG. 24, one UE per slot transmits an SA. A D2DSS and SA1 are transmitted together, or SA1 and SA2 are transmitted together. The last symbol of each SA is a transition symbol. Since a UE transmitting SA1 is different from a UE transmitting SA2, there may be a frequency error (or a frequency offset) of a certain level between the two SA signals. Accordingly, one DMRS may not be sufficient to compensate the frequency error. Preferably, an OFDM symbol for a DMRS is added, and two DMRSs are used. An Rx UE may perform frequency error compensation and channel estimation together using the 2-symbol DMRS. FIGS. 24(a) to 24(c) show different DMRS locations and intervals. Specifically, FIG. 24(a) shows DMRSs spaced 1 symbol from each other, FIG. 24(b) shows DMRSs spaced 2 symbols from each other, and FIG. 24(c) shows DMRSs spaced 3 symbols from each other.

FIG. 25 is a reference diagram illustrating presence of two DMRSs per SA in an extended CP according to the present invention. In FIGS. 24 and 25, a D2DSS of the first slot is configured. If a sufficient number of OFDM symbols of the D2DSS are provided, nothing may be assigned to the last symbol located by the slot boundary in order to save Tx power and secure switching time for receiving a following SA signal.

Further, in the present invention, it is assumed that the locations of DMRS symbols in a synchronization signal SF are identical to the locations of DMRS symbols in an SA SF. This assumption may be established only when the symbol length of a PD2DSCH is a multiple/aliquot of the symbol length of an SA (including the AGC symbol) (length of PD2DSCH=length of k*SA). Accordingly, if the symbol length of the PD2DSCH is not a multiple/aliquot of the symbol length of an SA, the locations of the DMRS symbols in the synchronization signal SF may be different from the locations of the DMRS symbols in the SA SF. It is obvious that the locations of DMRS at which optimum performance is achieved may be different between the SFs if the symbol length of the PD2DSCH is not a multiple/aliquot of the symbol length of an SA.

Meanwhile, when the UL DMRS of WAN is used to perform channel estimation, locations close to the DMRS exhibit good channel estimation performance. Accordingly, a PD2DSCH or SA signal which needs to be demodulated may be located near the DMRS. In this case, the D2DSS may be located on a symbol far apart from the DMRS.

Figure 26:
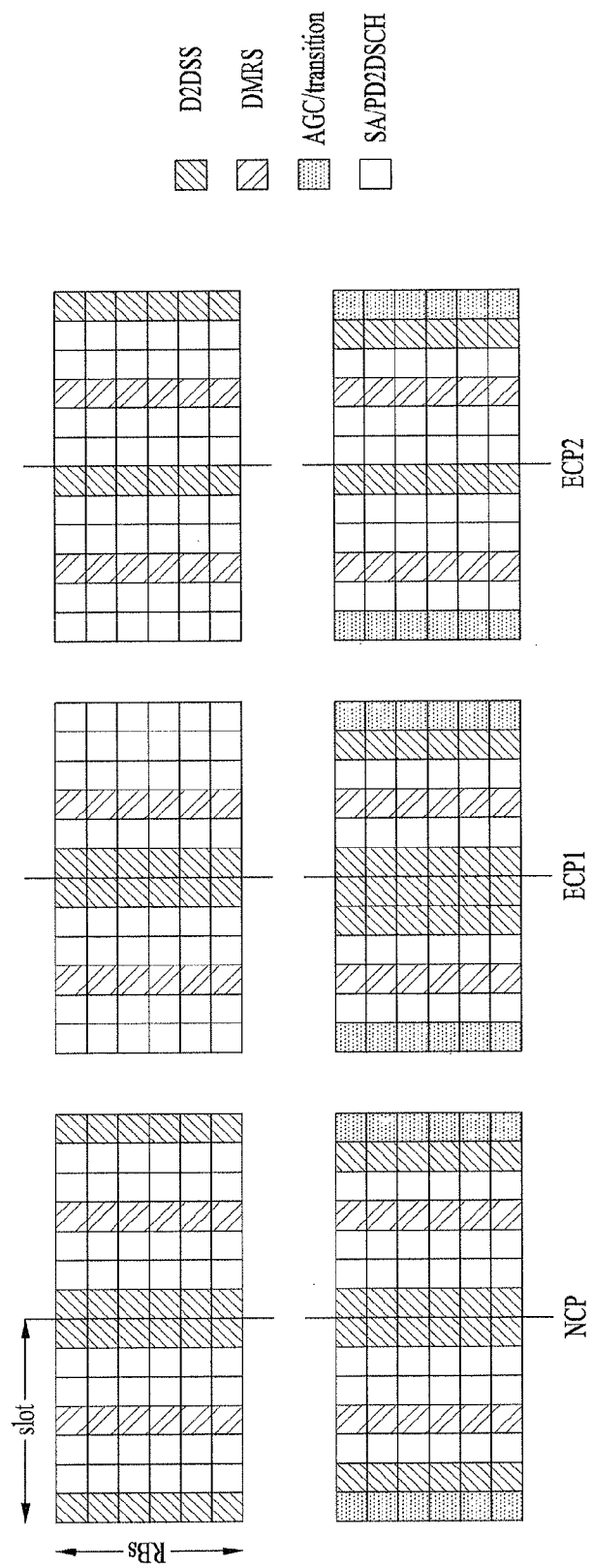
FIG. 26 is a reference diagram illustrating disposition of a D2DSS and SA/PD2DSCH signals (i.e., DMRS/D2DSS/PD2DSCH multiplexing) implemented when estimation is performed using the UL DMRS of WAN according to one embodiment.

FIG. 26 is a reference diagram illustrating disposition of D2DSSs and SA/PD2DSCH signals (i.e., DMRS/D2DSS/PD2DSCH multiplexing) implemented when estimation is performed using the UL DMRS of WAN according to one embodiment.

In FIG. 26, the upper portion represents cases in which a separate AGC symbol or a transition symbol is not considered. In the normal CP, the D2DSS is disposed on the symbol farthest from the DMRS, and SAs or PD2DSCH is disposed on the remaining symbols. In the extended CP, i) a D2DSS may be disposed on the last symbol of a slot, or ii) consecutive D2DSSs may be disposed in the middle of the SF, thereby maximizing channel estimation performance on the SA/PD2DSCH. If the first symbol is used as the AGC symbol, and the last symbol is used as the transition symbol, symbols near the DMRS may be used for the SA/PD2DSCH, and the D2DSS may be disposed on a symbol as far from the DMRS as possible.

The locations of the DMRS described above are not restricted to transmission of a D2D synchronization signal and an SA signal, but may be used in D2D communication. In this case, one UE may use all SFs (configured for D2D communication). Referring back to FIG. 25, SA UE2 transmits only the DMRS of slot1, and SA UE1 transmits the DMRS of slot2. On the other hand, in D2D communication, one UE may transmit all the 4 DMRSs.

Meanwhile, the D2DSS signal of the present invention may be configured by a combination of a primary D2DSS (PD2DSS) and a SD2DSS. The PD2DSS uses a length-L Zadoff-Chu (ZC) sequence, and the SD2DSS uses an M-sequence. As a possible combination of the PD2DSS and the SD2DSS, i) all D2DSSs may be configured by PD2DSSs, or 2) PD2DSSs and SD2DSSs may be used together. In particular, since the ZC sequence has a better PAPR property than the M-sequence, all D2DSSs are preferably configured by ZC sequences in terms of the PAPR property. The DMRS is basically configured by the ZC sequence, and the length thereof may be variable according to the bands of the PD2DSCH and the SA.

Figure 27:
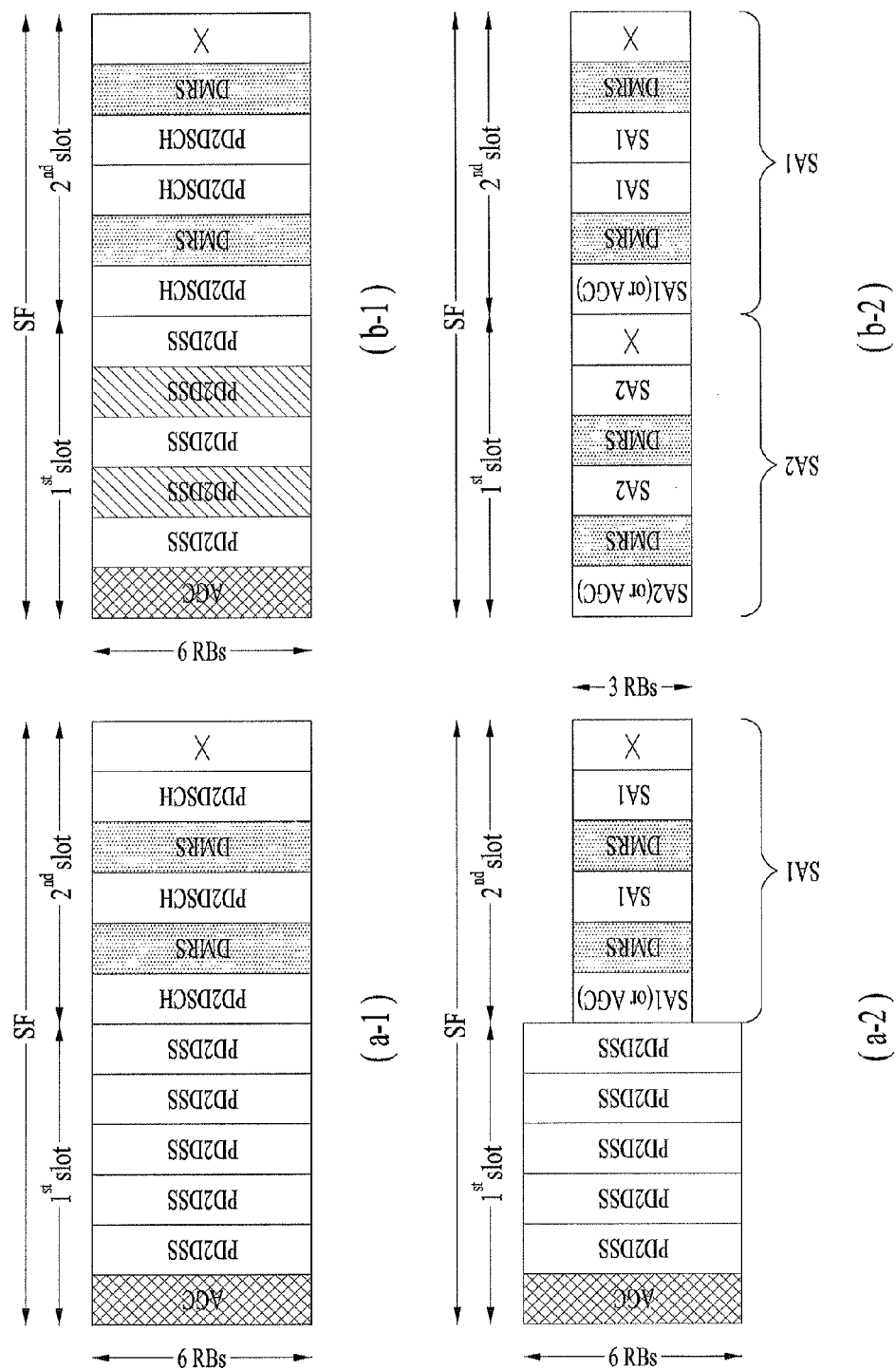
FIG. 27 illustrates configuration of D2DSS based on the extended CP of FIG. 25 according to one embodiment.

FIG. 27 illustrates configuration of D2DSS based on the extended CP of FIG. 25 according to one embodiment. FIG. 27(a) illustrates configuring all D2DSSs with PD2DSSs. Herein, it is assumed that the SA includes 3 RBs. FIG. 27(b) illustrates configuring two D2DSS OFDM symbols with SD2DSSs.

Figure 28:
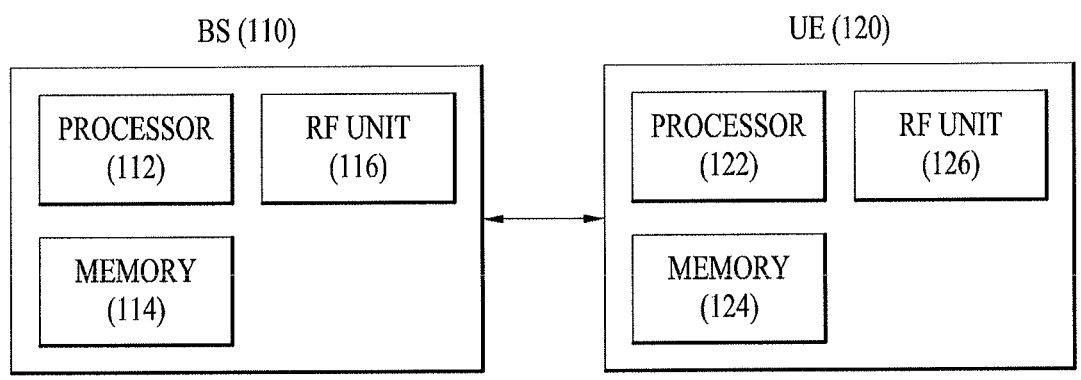
FIG. 28 illustrates an eNB and UE which are applicable to embodiments of the present invention.

FIG. 28 illustrates an eNB and UE which are applicable to embodiments of the present invention. When a relay is included in a wireless communication system, communication on the backhaul link is performed between the eNB and the relay, communication on the access link is performed between the relay and the UE. Accordingly, the eNB or the UE may be replaced by the relay depending on the situation.

Referring to FIG. 28, the wireless communication system includes a base station (BS) 110 and a UE 120. The BS 110 includes a processor 112, a memory 114, and a radio frequency (RF) unit 116. The processor 112 may be configured to perform the proposed procedures and/or methods according to the present invention. The memory 114 is connected to the processor 112 to store various kinds of information related to operations of the processor 112. The RF unit 116 is connected to the processor 112 and transmits and/or receives radio signals. The UE 120 includes a processor 122, a memory 124, and an RF unit 126. The processor 122 may be configured to perform the proposed procedures and/or methods according to the present invention. The memory 124 is connected to the processor 122 to store various kinds of information related to operations of the processor 122. The RF unit 126 is connected to the processor 122 and transmits and/or receives radio signals. The BS 110 and/or the UE 120 may have a single antenna or multiple antennas.

The embodiments of the present invention described above are combinations of elements and features of the present invention in a predetermined form. The elements or features may be considered selective unless otherwise mentioned. Each element or feature may be practiced without being combined with other elements or features. Further, an embodiment of the present invention may be constructed by combining some of the elements and/or features. The order of operations described in embodiments of the present invention may be changed. Some of elements or features of one embodiment may be included in another embodiment, or may be replaced with corresponding elements or features of another embodiment. It is apparent to those skilled in the art that claims that do not explicitly depend on each other in the appended claims may be combined to construct an embodiment of the present invention or included in a new claim by subsequent amendment after the application is filed.

The embodiments of the present invention may be achieved by various means, for example, hardware, firmware, software, or a combination thereof. In a hardware configuration, one embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, one embodiment of the present invention may be implemented in the form of a module, a procedure, a function, etc. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above is description, and all changes coming within the meaning and equivalency range of the appended claims are intended to be embraced therein.

INDUSTRIAL APPLICABILITY

A method for transmitting a signal for D2D communication in a wireless communication system and an apparatus for the same have been described focusing on an example applied to a 3GPP LTE system. The present invention is applicable to a variety of wireless communication systems in addition to the 3GPP LTE system.

What is claimed is:

1. A method for transmitting a signal for device-to-device (D2D) communication of a user equipment in a wireless communication system, the method comprising:
   configuring, by the user equipment, a D2D resource pool into a plurality of resource blocks for the D2D communication,
   wherein the plurality of resource blocks are configured to carry at least one of a D2D synchronization signal (D2DSS) or a Physical D2D synchronization channel (PD2DSCH); and
   transmitting, by the user equipment, a mapped scheduling assignment on a specific resource block carrying the PD2DSCH among the plurality of resource blocks,
   wherein a unit of the mapped scheduling assignment is configured to have a number of symbols according to channel estimation performance,
   wherein the specific resource block is configured to include demodulation reference signals in association with the mapped scheduling assignment, and
   wherein each of the demodulation reference signals is allocated to a different resource element based on a different resource element offset according to symbols of a corresponding demodulation reference signal.

2. The method according to claim 1, wherein a sequence of the demodulation reference signals is generated based on an identity of the user equipment.

3. The method according to claim 1, wherein a subframe number, to which the scheduling assignment is allocated, is indicated through higher layer signaling.

4. A user equipment (UE) for device-to-device (D2D) communication in a wireless communication system, the UE comprising:

a radio frequency unit; and a processor, wherein the processor is configured to:

configure a D2D resource pool into a plurality of resource blocks for the D2D communication, wherein the plurality of resource blocks are configured to carry at least one of a D2D synchronization signal (D2DSS) or a Physical D2D synchronization channel (PD2DSCH) and transmit a mapped scheduling assignment on a specific resource block carrying the PD2DSCH among the plurality of resource blocks, wherein a unit of the mapped scheduling assignment is configured to have a number of symbols according to channel estimation performance, wherein the specific resource block is configured to include demodulation reference signals in association with the mapped scheduling assignment, and wherein each of the demodulation reference signals is allocated to a different resource element based on a different resource element offset according to symbols of a corresponding demodulation reference signal.

5. The UE according to claim 4, wherein a sequence of the demodulation reference signals is generated based on an identity of the user equipment.

6. The UE according to claim 4, wherein a subframe number, to which the scheduling assignment is allocated, is indicated through higher layer signaling.

* * * * *